United States Patent
Da Silva et al.

(10) Patent No.: US 12,457,534 B2
(45) Date of Patent: Oct. 28, 2025

(54) MEASUREMENT REPORTING FOR CONDITIONAL HANDOVER CANDIDATES

(71) Applicant: TELEFONAKTIEBOLAGET LM ERICSSON (PUBL), Stockholm (SE)

(72) Inventors: Icaro L. J. Da Silva, Solna (SE); Cecilia Eklof, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 380 days.

(21) Appl. No.: 17/768,213

(22) PCT Filed: Oct. 12, 2020

(86) PCT No.: PCT/IB2020/059577
§ 371 (c)(1),
(2) Date: Apr. 11, 2022

(87) PCT Pub. No.: WO2021/070162
PCT Pub. Date: Apr. 15, 2021

(65) Prior Publication Data
US 2024/0098588 A1    Mar. 21, 2024

Related U.S. Application Data

(60) Provisional application No. 62/914,394, filed on Oct. 11, 2019.

(51) Int. Cl.
*H04W 36/00* (2009.01)
*H04W 36/24* (2009.01)
*H04W 36/36* (2009.01)

(52) U.S. Cl.
CPC ....... *H04W 36/0085* (2018.08); *H04W 36/24* (2013.01); *H04W 36/362* (2023.05)

(58) Field of Classification Search
None
See application file for complete search history.

(56) References Cited

U.S. PATENT DOCUMENTS

| | | | | |
|---|---|---|---|---|
| 8,805,369 | B2 * | 8/2014 | Huang | H04W 72/20 455/437 |
| 2014/0023045 | A1 | 1/2014 | Li et al. | |
| 2019/0230550 | A1 * | 7/2019 | Yiu | H04W 24/10 |

FOREIGN PATENT DOCUMENTS

| | | |
|---|---|---|
| CN | 101772063 A | 7/2010 |
| CN | 106162700 A | 11/2016 |
| CN | 106162770 A | 11/2016 |
| CN | 104581849 A | 7/2018 |

(Continued)

OTHER PUBLICATIONS

Ericsson, Configuration of Conditional handover in NR, R2-1909330, 3GPP TSG RAN WG2 #107, Prague, Czech Republic, Aug. 26-30, 2019.

(Continued)

*Primary Examiner* — Adolf Dsouza
(74) *Attorney, Agent, or Firm* — ERICSSON INC.

(57) ABSTRACT

A method performed by a wireless device for measurement reporting comprises receiving a conditional handover (CHO) configuration comprising one or more CHO candidate cells and associated triggering conditions; generating a measurement report comprising measurement information for the one or more CHO candidate cells; and transmitting the measurement report to a network node.

20 Claims, 13 Drawing Sheets

(56) References Cited

FOREIGN PATENT DOCUMENTS

| WO | 2018228702 | A1 | 12/2018 |
|----|------------|----|---------|
| WO | 2019088905 | A1 | 5/2019 |
| WO | 2019134163 | A1 | 7/2019 |
| WO | 2021003715 |    | 1/2021 |

OTHER PUBLICATIONS

Ericsson, Handling of a HO command while UE is monitoring CHO, R2-1912633, 3GPP TSG RAN WG2 #107bis, Chongqing, P.R. China, Oct. 14-18, 2019.

Ericsson, Handling of a HO command while UE is monitoring CHO, Tdoc R2-1914635, 3GPP TSG RAN WG2 #108, Reno, Nevada, USA, Nov. 18-22, 2019.

Ericsson, TP for 38.331 ion CHO, R2-1914638, 3GPP TSG-RAN WG2 #108, Reno, Nevada, USA, Nov. 18-22, 2019.

Panasonic, Discussion on the leaving conditions for NR CHO, R2-1909255, 3GPP TSG-RAN WG2 Meeting#107, Prague, Czech Republic, Aug. 26-Aug. 30, 2019.

Qualcomm Incorporated, LTE Conditional HO design considerations, R2-1906375, 3GPP TSG-RAN WG2 Meeting #106, Reno, USA, May 13-17, 2019.

LG Electronics Inc: "ReportConfig ID for CHO Condition". 3GPP TSG-RAN WG2 Meeting #107bis. R2-1913863. Chongqing, China. Oct. 14-18, 2019.

Spreadtrum Communications, "Measurement report enhancement in conditional handover", R2-1912240 (Revision of R2-1909083), 3GPP TSG-RAN WG2 Meeting #107bis, Chongqing, China, Oct. 14-18, 2019.

Mediatek Inc., "Discussions on NR Conditional Handover Procedures", 3GPP TSG-RAN WG2 Meeting #106, R2-1906482, May 13-17, 2019, 8 Pages, Reno, NV, USA.

* cited by examiner

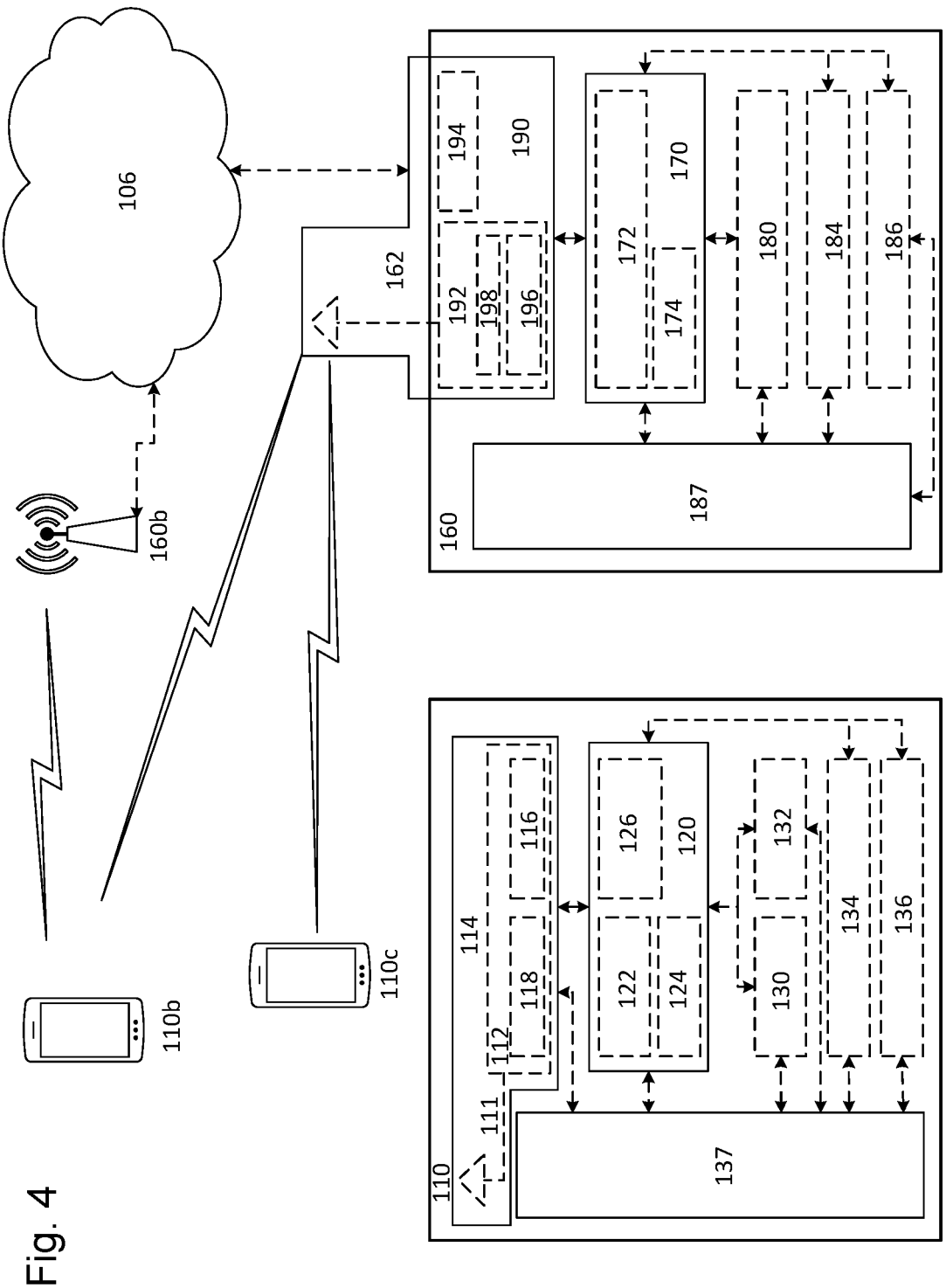

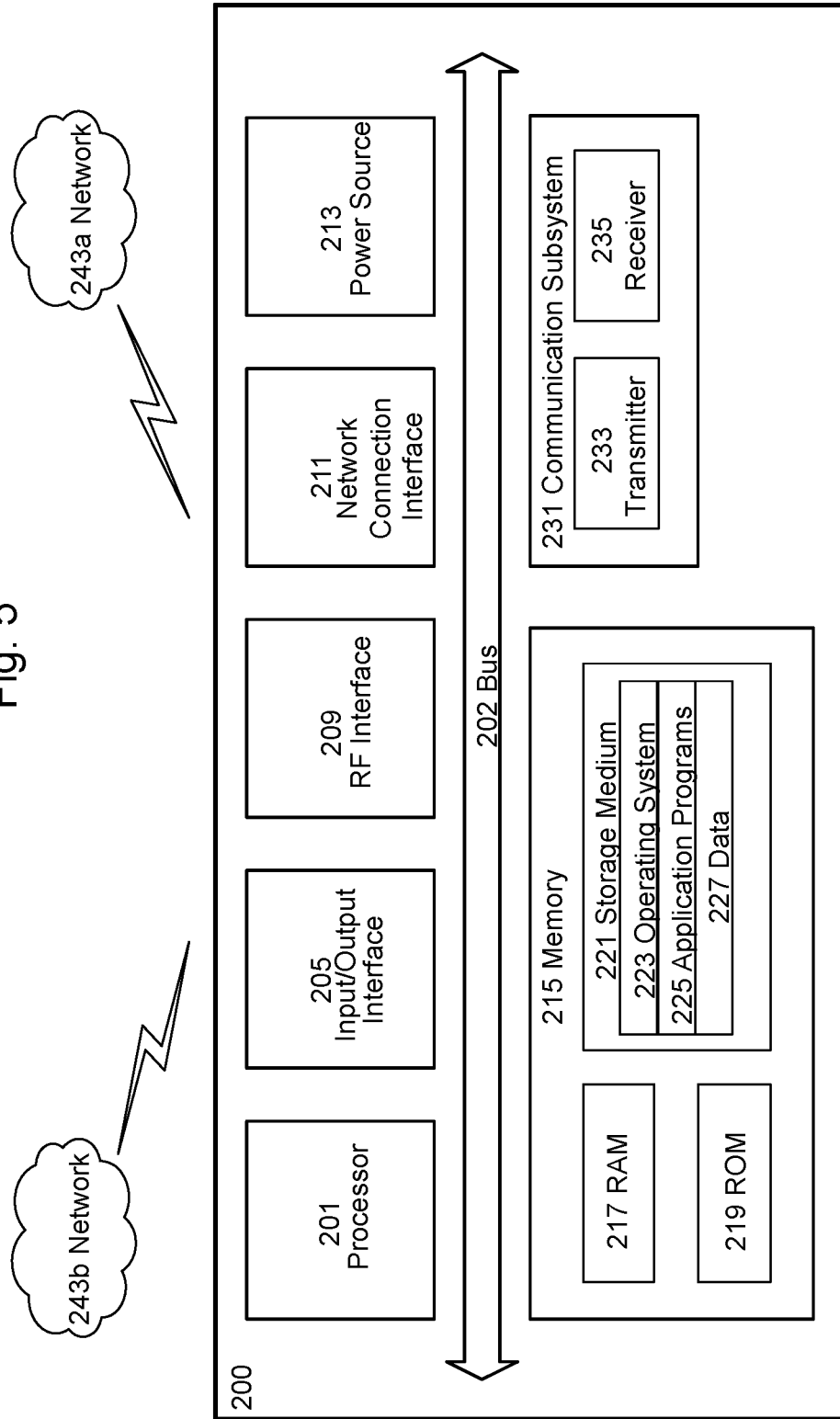

MEASUREMENT REPORTING FOR CONDITIONAL HANDOVER CANDIDATES

This application is a 371 of International Application No. PCT/IB2020/059577, filed Oct. 12, 2020, which claims the benefit of U.S. Application No. 62/914,394, filed Oct. 11, 2019, the disclosures of which are fully incorporated herein by reference.

TECHNICAL FIELD

Embodiments of the present disclosure are directed to wireless communications and, more particularly, to measurement reporting for conditional handover (CHO) candidates.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Enhancements to Third Generation Partnership Project (3GPP) long term evolution (LTE) and fifth generation (5G) new radio (NR) include mobility. An objective is to improve the robustness at handover and to decrease the interruption time at handover. One problem related to robustness at handover (HO) is that the HO Command (RRCConnectionReconfiguration with mobilityControlInfo and RRCReconfiguration with a reconfigurationWithSync field) is normally sent when the radio conditions for the UE are already quite bad. This may result in the HO Command not reaching the user equipment (UE) in time if the message is segmented or there are retransmissions. Another problem is that measurement reports may not reach the network because of bad radio conditions, and thus the network does not even have the chance to issue a handover command. An example is illustrated in FIG. 1:

FIG. 1 is a sequence diagram illustrating examples of mobility robustness problems. In the diagram on the left, a measurement report transmitted from the UE to the source network node does not reach the source network node because of bad radio conditions. The radio conditions get worse and the UE eventually declares radio link failure (RLF) and performs a reestablishment procedure.

IN the diagram on the right, the measurement report reaches the source network node from the UE, but handover command from the source network node does not reach the UE. The UE eventually declares radio link failure (RLF) and performs a reestablishment procedure.

In LTE and NR, different solutions to increase mobility robustness have been discussed. One solution discussed in NR is referred to as "conditional handover" or "early handover command." To avoid the undesired dependence on the serving radio link (and radio conditions) at the time when the UE should execute the handover, one possibility is to provide radio resource control (RRC) signaling for the handover to the UE earlier. To achieve this, the handover command may be associated with a condition (e.g., based on radio conditions possibly similar to the ones associated to an A3 event), where a given neighbor becomes 'X' dB better than the serving cell. As soon as the condition is fulfilled, the UE executes the handover in accordance with the provided handover command.

The condition could be, for example, that the quality of the target cell or beam becomes 'Y' dB stronger than the serving cell (something like an A3 event). The threshold X used in a preceding measurement reporting event should then be chosen lower than the one in the handover execution condition. This facilitates the serving cell preparing the handover upon reception of an early measurement report and to provide the RRCConnectionReconfiguration with mobilityControlInfo (or RRCReconfiguration with ReconfigurationWithSync) at a time when the radio link between the source cell and the UE is still stable. The execution of the handover is done at a later point in time (at a different signal threshold) which is considered optimal for the handover execution. An example is illustrated in FIG. 2.

FIG. 2 is a sequence diagram illustrating an example conditional handover (CHO). The illustrated example includes a serving cell and a single target cell. In practice, there may often be many cells or beams that the UE reported as possible candidates based on its preceding radio resource management (RRM) measurements. The network may have the freedom to issue conditional handover commands for several of the candidates. The RRCConnectionReconfiguration (or RRCReconfiguration, in NR) for each of the candidates may differ, for example, in terms of the HO execution condition (e.g., reference signals to measure and threshold to exceed) as well as in terms of the random access (RA) preamble to send when a condition is met.

While the UE evaluates the condition, it continues operating per its current RRC configuration, i.e., without applying the conditional HO command. When the UE determines that the condition is fulfilled, the UE disconnects from the serving cell, applies the conditional HO command and connects to the target cell. The steps performed after determining the condition is fulfilled are equivalent to the current, instantaneous handover execution.

A relationship exists between measurement reporting and conditional handover. In NR reconfiguration with sync, measurement configuration/reporting and handovers are independent procedures specified in RRC, even if measurement configuration/reporting may be used by the network to assist handover decisions. The same principle may be considered for CHO and measurement configuration/reporting.

For CHO in NR, the baseline operation for CHO assumes a handover command type of message contains handover triggering condition(s) and dedicated RRC configuration(s). A UE accesses the prepared target when the relevant condition is met. The baseline operation for CHO assumes the source RAN remains responsible for RRC until the UE successfully sends RRC Reconfiguration Complete message to the target RAN The source remains responsible for the UE while the UE monitors CHO triggering conditions. Consequently, while the UE monitors CHO triggering conditions, the source may require the UE to perform measurements. The UE is also performing RRM measurements configured by the network and possibly triggering measurement reports. That may be useful in different manners such as allowing the network to re-configure CHO (e.g. add/remove cells and/or modify CHO configurations) or to trigger a handover. Thus, the UE may send measurement reports while monitoring CHO triggering conditions.

In principle, the network could configure the UE with a measurement report associated to an event (e.g., A3 or A5), and associate the same condition for the triggering of a given CHO. In that case, it is ambiguous for the UE whether it measObject for synchronization signal block (SSB) frequency Fx, the UE would trigger a measurement report when at least one cell in frequency Fx fulfils the A4 conditions during a timer to trigger period, i.e., at least one cell is above the configured threshold in reportConfig. The cells fulfilling the condition are referred to as triggered cells and in principle are the cells considered to be included in the measurement report that was triggered. In NR RRC (TS 38.331) this inclusion of triggered cells is defined as follows:

---

```
5.5.4      Measurement report triggering
5.5.4.1    General
           If AS security has been activated successfully, the UE shall:
    1>     for each measId included in the measIdList within VarMeasConfig:
    [...]
        2>   if the reportType is set to eventTriggered and if the entry condition applicable for this event, i.e. the
             event corresponding with the eventId of the corresponding reportConfig within VarMeasConfig, is
             fulfilled for one or more applicable cells for all measurements after layer 3 filtering taken during
             timeToTrigger defined for this event within the VarMeasConfig, while the VarMeasReportList does not
             include a measurement reporting entry for this measId (a first cell triggers the event):
             [ ... ]
            3>    include the concerned cell(s) in the cells TriggeredList defined within the VarMeasReportList for
                  this measId;
            3>    initiate the measurement reporting procedure, as specified in 5.5.5;
```

--- should send the measurement report before executing the CHO, or whether it should ignore the measurement report and execute the CHO.

Thus, one proposal is the CHO execution does not trigger measurement reporting and, on cell level A3/A5-like CHO execution condition shall be specified (other events will not be specified without clear justifications). The proposal, however, could be interpreted as if the network would not be allowed to configure CHO with the same triggering condition associated to a measurement report. Alternately, it could be interpreted that if the network does that configuration, the UE first executes the CHO and ignores the measurement reporting.

Neither interpretation is correct, because the configuration of an event with similar trigger condition for both CHO configuration may be useful. For example, if the network configures a cell-A in frequency F0 for CHO, but still wants to be able to perform ordinary handovers in case the UE finds another cell-B in the same frequency F0, the network would benefit in configuring a measurement report if the UE finds cell-B before the condition for cell-A is fulfilled.

This may be problematic if the triggering cell in the event is allowed to be the same as the one in the CHO execution. Even though this might cause some ambiguity and, if nothing is specified there would be no consistent UE behaviour, the network could prevent that from happening, for example, by black listing the cell(s) with CHO in the same frequency, for similar triggering conditions, to avoid the ambiguity. Thus, specifications could allow the UE to be configured with the same trigger condition for CHO and measurement report. Ambiguities on which procedure to execute can be fixed with network implementation, e.g., blacklist of CHO cell(s).

There currently exist certain challenges. For example, according to the current solution in the RRC specifications, triggered cells, serving cells (and possibly best neighbor on a serving frequency) can be included in an event triggered measurements report. For example, if the UE is configured with a measId associated to a reportConfig for an event A4 (Neighbor becomes better than threshold) associated to a For conditional handover, the reporting of triggered cells (e.g., based on an A3 event associated to a given target frequency and having thresholds with a trigger point earlier than the typical value for handovers) can be configured towards a UE by the network so that the measurement results can be used as input by the network to configure conditional handover.

These measurements can be used as input by the network to configure a list of target cell candidates for CHO. A typical network implementation may try to select out of the reported cells, the best according to quality criteria (if possible, such as best reference signal received power (RSRP), best reference signal received quality (RSRQ), etc.).

After the UE is configured with a list of target cell candidates for CHO, the actual handover is not executed until the conditions are fulfilled, which can be after a certain period of time has passed. During this time what was considered the best cells may change. The cells included in this first report that were previously the strongest may not be as strong anymore, but instead other cells which were not strong before are now stronger. The network is not aware of that the sorting has changed, because that is never reported to the network unless measurement reports are configured for the same frequency. The new best candidate may not even be configured with CHO, but instead a cell which is not as good anymore.

One proposal is that the network is able to configure the UE with a measurement identifier associated to a reportConfig and measObject that are somewhat similar to the measObject and reportConfig for CHO configurations. That would enable the network to receive a measurement report for cells that are fulfilling certain criteria that may become good CHO candidates for that frequency.

In other words, if the network configures the UE for CHO in a frequency Fx with cells C0, C1, C2, the network should be able to configure the UE to transmit a measurement report when a new cell in the same frequency is found and is in good condition, because the new cell might actually be a good or better candidate for a subsequent CHO configuration, i.e., the network might want to remove one of the current cells in the frequency (e.g., C0, C1 or C2) and add a new cell that has better radio conditions (according to a criteria defined at the network).

A problem with the current solution is that a measurement report only includes neighbor cells that are triggered cells (i.e., that fulfill the condition). The CHO configuration at the UE may comprise cells (in this example C0, C1 or C2) that are not triggered cells according to that measurement report's trigger configuration. Thus, even if the network knows there are good cells (possibly better than the configured ones) in the frequency, the received measurement report may not include information for the network to determine the conditions of CHO cells that the UE is currently monitoring.

Consequently, the network can only perform sub-optimal actions like removing all previously configured CHO target candidate cells without knowing how good/bad their radio conditions are. Alternatively, the network may not reconfigure CHO at the UE, which may result in the UE executing a CHO to a cell that is not the best cell or it may not execute CHO at all. This may lead to loss of the connection and re-establishment. One option might be for the network to simply add new CHO cells, however, the RRC specs have a maximum number of CHO candidates the UE is able to monitor. Thus, to add a new one, the network may need to remove another one.

SUMMARY

Based on the description above, certain challenges currently exist with measurement reporting for conditional handover candidates. Certain aspects of the present disclosure and their embodiments may provide solutions to these or other challenges. For example, particular embodiments disclosed herein describe a method used by wireless terminal (also referred to as a user equipment (UE)) for measurement reporting. The method may include measuring signal quality for one or more cells and then including measurement information of conditional handover (CHO) target cell candidate(s) in a measurement report. The UE may transmit a measurement report that includes the measurement information for each CHO target cell candidate.

In some embodiments, the inclusion of measurement information of CHO target cell candidate(s) in measurement reports is controlled by a configuration provided to the UE by the network.

The method may also include one or more rules specifying for which cases the UE should send a MeasurementReport when the configured measurement condition is fulfilled. In some embodiments, the rule may be configurable (e.g., by the network).

From the network perspective, the method may include one or more network nodes (e.g., a gNodeB at a next generation radio access network (NG-RAN)) receiving a measurement report including measurement information of CHO target cell candidate(s) in a measurement report. Based on the information from the UE, the network node may then determine CHO reconfigurations for the UE that transmitted the measurement report. Depending on the conditions of the network and the information in the measurement report, the CHO reconfigurations may comprise adding one or more new CHO target cell candidates, where a new cell may be one of the cells included in the measurement report (e.g., a triggered cell) (this may be done, e.g., if the UE has configured a number of cells that do not exceed the maximum number of configured CHO cells); modify a CHO configuration associated with one of the CHO target cell candidates (e.g., change the trigger/execution condition, replace the stored RRCReconfiguration within the container, etc.); or remove a CHO configuration associated to one of the CHO target cell candidates. In some embodiments, the network or the network node may configure the UE to include measurement information of CHO target cell candidate(s) in measurement reports.

According to some embodiments, a method performed by a wireless device for measurement reporting comprises receiving a CHO configuration comprising one or more CHO candidate cells and associated triggering conditions, generating a measurement report comprising measurement information for the one or more CHO candidate cells, and transmitting the measurement report to a network node.

In particular embodiments, the method further comprises obtaining an indication that indicates whether the wireless device includes measurement information for the one or more CHO candidate cells in the measurement report. For example, the wireless device may always include measurement information for the one or more CHO candidate cells in the measurement report when CHO is configured for the wireless device, may include measurement information for one or more CHO candidate cells in the measurement report when a measurement for the CHO candidate cell is above or below a preconfigured threshold, or may include measurement information for the one or more CHO candidate cells in the measurement report when a sorting quality has changed. The indication may be obtained as part of the CHO configuration or as part of a measurement configuration.

In particular embodiments, the measurement report comprises one or more of: an event triggered measurement report; a periodical measurement report; a cell global identity (CGI) report; a cross-link interference (CLI) report; a system frame number frame timing difference (SFTD) report.; a measurement report configured in a measId that is also used for a CHO configuration trigger condition; and a measurement report configured in a measId for event triggered measurement reporting that is associated to the same measObject as another measId for CHO.

In particular embodiments, the measurement information comprises one or more of: CHO target cell candidate measurements per cell; CHO target cell candidate list that are fulfilling a condition; and beam measurement information for CHO target cell candidates.

In particular embodiments the method further comprises receiving a CHO configuration update from the network node based on the transmitted measurement report.

According to some embodiments, a wireless device is capable of measurement reporting. The wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method in a network node comprises receiving a measurement report from a wireless device. The measurement report comprises measurement information for one or more CHO candidate cells. The method further comprises determining one or more CHO configuration updates for the wireless device based at least in part on the received measurement information for the one or more conditional handover CHO candidate cells.

In particular embodiments, the CHO configuration update includes one or more of: removing a CHO candidate cell from the CHO configuration; adding a CHO candidate cell to the CHO configuration; and modifying an existing CHO candidate cell in the CHO configuration.

In particular embodiments, the method further comprises transmitting an indication to the wireless device that indicates whether the wireless device includes measurement information for one or more CHO candidate cells in the measurement report. For example, the wireless device may always include measurement information for the one or more CHO candidate cells in the measurement report when CHO is configured for the wireless device, may include measurement information for one or more CHO candidate cells in the measurement report when a measurement for the CHO candidate cell is above or below a preconfigured threshold, or may include measurement information for the one or more CHO candidate cells in the measurement report when a sorting quality has changed. The indication may be transmitted as part of a CHO configuration or as part of a measurement configuration.

In particular embodiments, the method further comprises configuring the wireless device with two measurement identifiers for a same measurement object and with two report configurations, wherein one of the report configurations is for CHO and the other report configuration is for a measurement report.

According to some embodiments, a network node comprises processing circuitry operable to perform any of the network node methods described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments may provide the network enhanced information about which cells are currently strongest for the UE and changes with respect to those cells. This provides the network the capability to configure the best candidate cells with CHO, which in turn leads to increased robustness and less risk of lost connections and re-establishments. In addition, reporting the CHO target candidates in measurement reports gives the UE the possibility to have CHO configurations for the best target candidate cells, because the network has the latest measurement information for new candidates and compares with the radio conditions of currently configured CHO target candidates.

In other words, if the network configures the UE for CHO in a frequency Fx with cells C0, C1, C2, the network is able to configure the UE to transmit a measurement report when a new cell in the same frequency is found and is in good condition, because the new cell might be a good or better candidate for a subsequent CHO configuration (i.e., the network might want to remove one of the current cells in the frequency (e.g., C0, C1 or C2) and add a new cell (e.g., C3) that has better radio conditions (according to a criteria defined at the network).

As described above, particular advantages may be achieved with a UE that can send a measurement report that includes neighbor cells that are triggered cells and CHO target candidate cells (in this example C0, C1 or C2) that are not necessarily triggered (according to that measurement report configuration). That enables the network to know how good new cells are compared to currently configured CHO target candidates, which empowers the network to make more educated decision, which helps the UE to improve the retainability performance by reducing the probability of radio link failure. Consequently, the network can perform optimal actions like remove previously configured CHO target candidate cells knowing how good/bad their radio conditions are. The network may reconfigure CHO at that UE, which increases the probability of a UE executing a CHO to a cell that is the best cell.

BRIEF DESCRIPTION OF THE DRAWINGS

For a more complete understanding of the disclosed embodiments and their features and advantages, reference is now made to the following description, taken in conjunction with the accompanying drawings, in which:

FIG. 4 is a block diagram illustrating an example wireless network;

FIG. 5 illustrates an example user equipment, according to certain embodiments;

DETAILED DESCRIPTION

Figure 1:
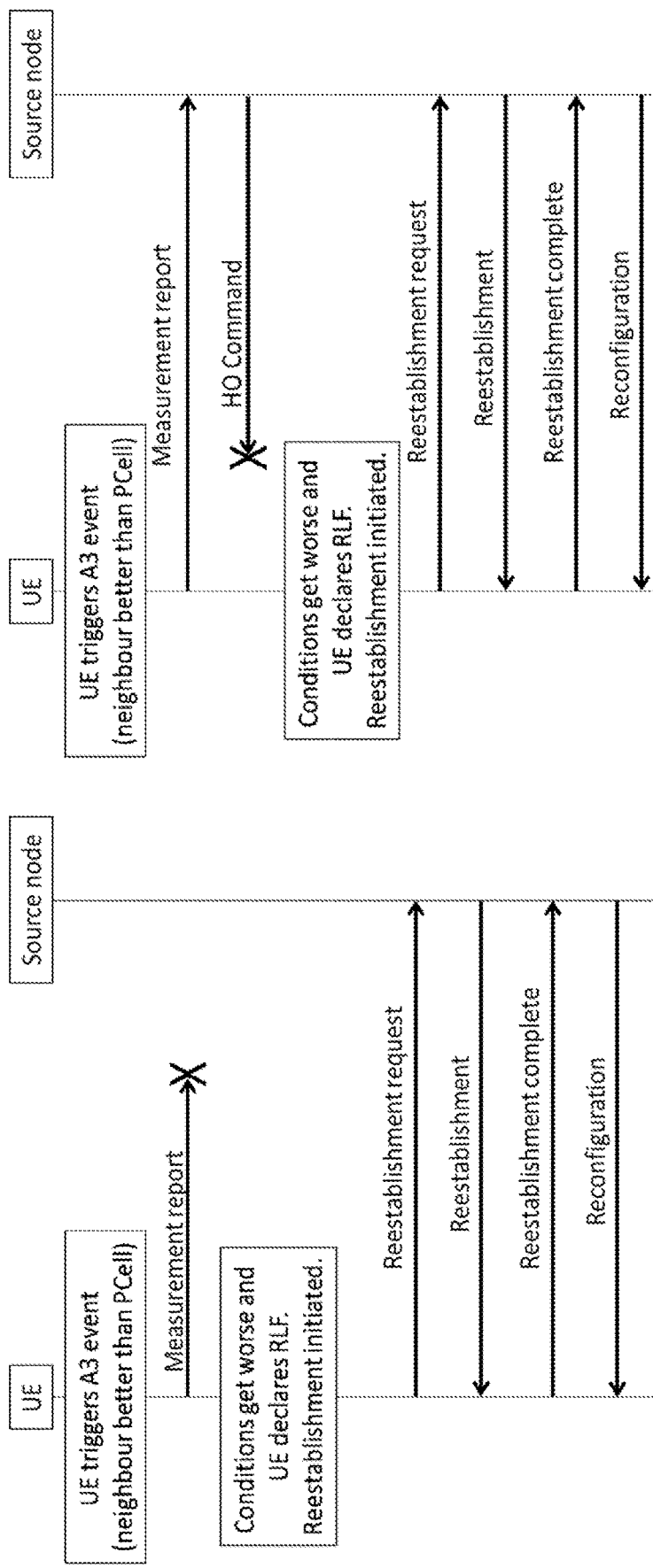
FIG. 1 is a sequence diagram illustrating examples of mobility robustness problems.
Figure 2:
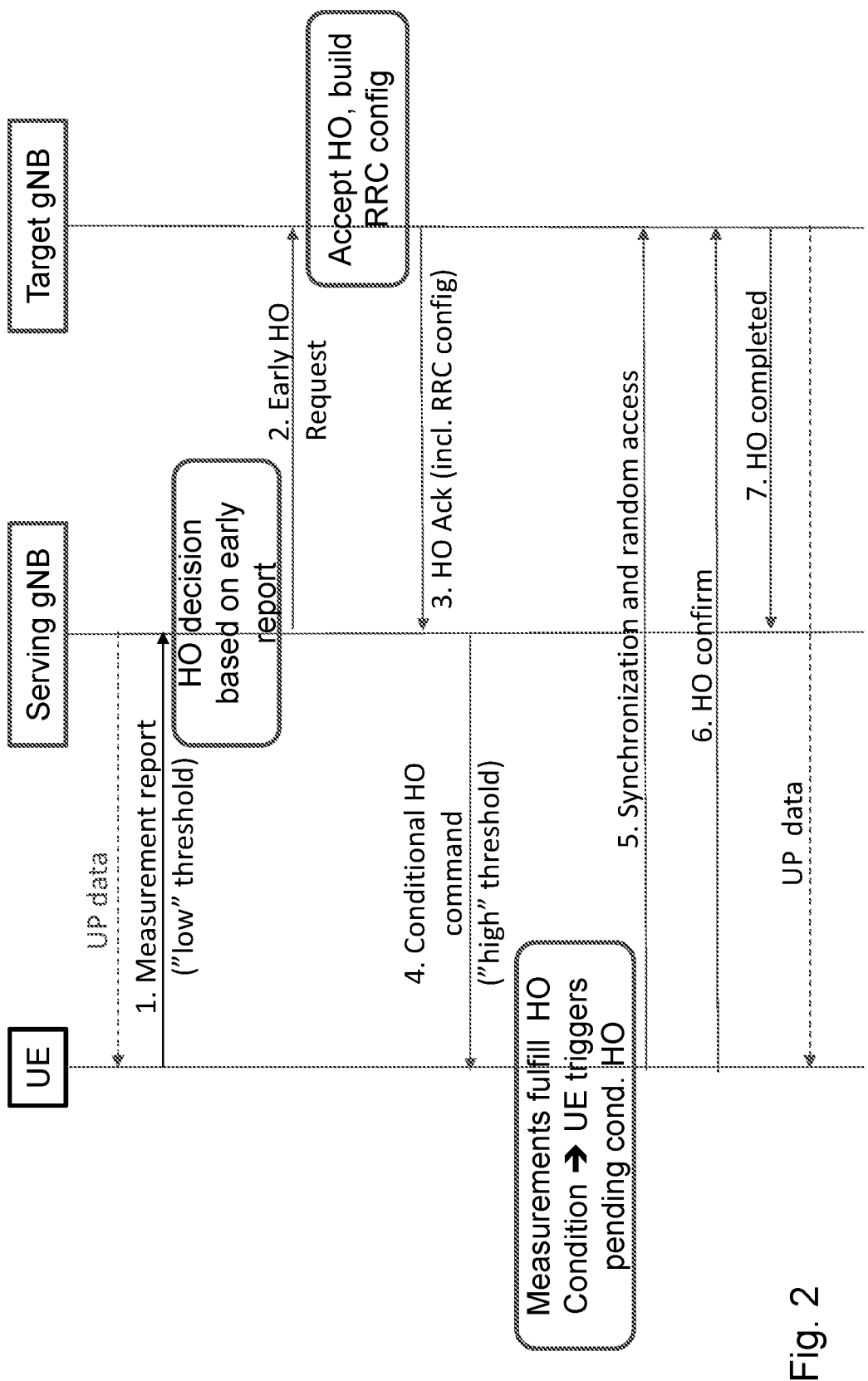
FIG. 2 is a sequence diagram illustrating an example conditional handover.

As described above, certain challenges currently exist with measurement reporting for conditional handover candidates. For example, a current problem is that a measurement report only includes neighbor cells that are triggered cells. The conditional handover (CHO) configuration at the user equipment (UE) may comprise cells that are not triggered cells according to that measurement report's trigger configuration. Thus, even if the network knows there are good cells (possibly better than the configured ones) in the frequency, the received measurement report may not include information for the network to determine the conditions of CHO cells that the UE is currently monitoring.

Certain aspects of the present disclosure and their embodiments may provide solutions to these or other challenges. For example, particular embodiments disclosed herein describe a method used by wireless device for measurement reporting. The method may include measuring signal quality for one or more cells and then including measurement information of CHO target cell candidate(s) in a measurement report. The UE may transmit a measurement report that includes the measurement information for each CHO target cell candidate.

From the network perspective, the method may include one or more network nodes receiving a measurement report including measurement information of CHO target cell candidate(s) in a measurement report. Based on the information from the UE, the network node may then determine CHO reconfigurations for the UE that transmitted the measurement report. Depending on the conditions of the network and the information in the measurement report, the CHO reconfigurations may comprise adding one or more new CHO target cell candidates, where a new cell may be one of the cells included in the measurement report; modifying a CHO configuration associated with one of the CHO target cell candidates; or removing a CHO configuration associated to one of the CHO target cell candidates.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Herein the term "handover" or "reconfiguration with synchronization" are used with a similar meaning. Thus, a conditional handover may also be referred to as a conditional reconfiguration with synchronization. In new radio (NR) terminology, handovers are typically referred to as an RRCReconfiguration with a reconfigurationWithSync (field containing configuration necessary to execute a handover). In long term evolution (LTE) terminology, the handovers are typically referred to as an RRCConnectionReconfiguration with a mobilityControlInfo (field containing configuration necessary to execute a handover).

Most of the UE and network actions herein are described as being performed in NR or LTE, mainly with NR terminology (e.g., in the case of message names). In other words, the configuration of a CHO received in NR for NR cells applies to a CHO executed in NR. However, particular embodiments are also applicable when any of the steps occur in different radio access technologies (RATs).

For example, when a UE is configured with a CHO in NR (for candidate NR and LTE cells), then the condition is triggered for an NR cell and the UE executes the HO in NR. When a UE is configured with a CHO in LTE (for candidate NR and LTE cells), then the condition is triggered for an LTE cell and the UE executes the HO in LTE. When a UE is configured with a CHO in NR (for candidate NR and LTE cells), then the condition is triggered for an LTE cell and UE executes the HO in LTE. When a UE is configured with a CHO in LTE (for candidate NR and LTE cells), then the condition is triggered for an NR cell and UE executes the HO in NR. In more general terms, a UE is configured with a CHO in RAT-1 for cells in RAT-1 or RAT-2, then the condition is triggered, and UE executes the HO in RAT-2.

In addition, embodiments herein are described in the context of conditional handover, which should not be seen as a limiting factor. The method may also be applicable for handovers triggered by the reception of an RRCReconfiguration message with a reconfigurationWithSync without any condition associated (or RRCConnectionReconfiguration with a mobilityControlInfo). Thus, the method is also applicable to procedures like conditional PSCell addition and conditional PSCell change.

As used herein, the term "conditional handover" has been used to refer to conditional mobility in more general terms, i.e., conditional resume, conditional reconfiguration with synchronization, conditional reconfiguration, and conditional handover. The term should be interpreted fundamentally as any procedure that is configured by the network to the UE that contains a condition (e.g., associated to a measurement event) and, upon the triggering of that condition the UE shall perform the mobility related procedure, e.g., resume, handover, reconfiguration with synchronization, beam switching, reestablishment, beam recovery, etc.

Particular embodiments also apply for a conditional mobility configuration associated to a single cell or to multiple cells. In the case of single cell, a single measurement configuration reference is provided and linked/associated to a mobility procedure (in the sense that UE monitors a specific condition and when it is fulfilled the UE executes a specific procedure towards a specific node, e.g., specific target cell). In the case of multiple cells, a single measurement configuration reference may be provided and linked to the monitoring of multiple cells, e.g., within the same measurement object/frequency. Alternatively, multiple measurement configuration references may be provided referring/linking to different cells.

For the cells to be monitored for conditional handover, the UE may be configured with an RRCReconfiguration with reconfigurationWithSync (for NR) or RRCConnectionReconfiguration with mobilityControlInfo (for LTE), e.g., associated to a cell to be accessed when the condition is triggered.

For the cells to be monitored for conditional resume, the UE may be configured with at least one inactive radio network temporary identifier (I-RNTI) (for NR) or Resume ID (for LTE) (or another UE identifier) to be included in the RRCResumeRequest (for NR) or RRCConnectionResumeRequest (for LTE) (or similar message). Alternatively, this could be a source cell RNTI (C-RNTI)+physical cell identifier (PCI), like in the reestablishment request. For NR, the source node may provide a short or long I-RNTI depending how each potential target accepts long or short I-RNTI, depending on coverage. The source may provide both (short and long) I-RNTI and conditions per cell so that depending on which cell triggers the condition the UE includes the RRCResumeRequest-like message and the short or the long I-RNTI.

In some embodiments, a UE may be configured for handling measurement configurations upon conditional mobility configurations (e.g., conditional handover). As configured, the UE may, depending on the scenario, perform the following actions.

The UE may receive a measurement configuration, store the configuration, and perform measurements accordingly. The UE may receive configuration of CHO containing CHO candidate cells and triggering conditions. In addition to measurements of CHO candidates, the UE is monitoring in triggered MeasurementReports; The UE also includes measurements of CHO candidates if it is not the first cell that triggers the event.

The UE may define a rule for including CHO candidates in MeasurementReport, e.g. that if CHO is configured, the UE shall always include measurements of CHO candidates.

In some embodiments, the UE receives a configuration for whether the UE should include CHO candidates the UE is monitoring in the triggered MeasurementReport. The configuration may consist of a flag (implemented as BOOLEAN, an ON/OFF indication, TRUE/FALSE, etc.). The configuration may also be more enhanced and consist of defined cases when the UE shall include the CHO candidates, e.g. when above/below certain thresholds. The cases when CHO candidates should be included may also be defined as a rule described in the specification, e.g. that if CHO is configured the UE shall include measurements of CHO candidates if the sorting quality has changed.

In some embodiments, the UE may include measurement information of CHO target cell candidate(s) in a measurement report. The measurement report can be at least one of the following: event triggered measurement report; periodical measurement report; cell global identity (CGI) report; cross-link interference (CLI) report; and a system frame number frame timing difference (SFTD) report.

The measurement report may be a measurement report configured in a measId that is also used for CHO configuration trigger/execution condition. It can be an indication that is part of the measurement configuration associated to the trigger/execution conditions of a CHO configuration. In other words, as part of the CHO configuration for a given trigger/execution condition associated to a measurement identifier, an indication like a flag ("include").

The measurement report may be a measurement report configured in a measId for even triggered measurement reporting that is associated to the same measObject as another measId for CHO.

The measurement information can be at least one of the following. The measurement information may comprise CHO target cell candidate measurements such as: reference signal received power (RSRP) per cell, reference signal received quality (RSRQ) per cell, and signal to interference plus noise ratio (SINR) per cell; CHO target cell candidate list (e.g., physical cell identities) that are fulfilling a condition, e.g., the event trigger condition, or another condition (also possibly configured); and beam measurement information for CHO target cell candidates.

The beam measurement information may include: RSRP per beam, RSRQ per beam, SINR per beam (e.g. for a one or multiple CHO target cell candidates); beam indexes derived from beam measurements such as RSRP per beam, RSRQ per beam, SINR per beam (e.g., for a one or multiple CHO target cell candidates). A beam can be interpreted as an synchronization signal (SS)/physical broadcast channel (PBCH) block, i.e., beam measurement information may be derived from measurements performed on an SS/PBCH block (which comprises reference signals that are measured by the UE). A beam may be interpreted as an channel state information reference signal (CSI-RS), i.e., a beam measurement information may be derived from measurements performed on a CSI-RS (which comprises reference signals that are measured by the UE).

The UE may transmit a measurement report including information of CHO target cell candidate(s).

In some embodiments, the inclusion of measurement information of CHO target cell candidate(s) in measurement reports is controlled by a configuration provided to the UE by the network. In some embodiments, the UE receives the configuration as part of the measurement configuration, e.g., as part of reportConfig of IE ReportConfigNR, as part of measObject of IE MeasObjectNR. The configuration may be an indication (e.g., a flag in reportConfig of ReportConfigNR IE) to indicate that CHO target candidate measurements are to be included. Thus, upon receiving the configuration and upon detecting the triggering of a measurement report associated to the configuration (reportConfig including the indication), the UE includes measurement information of CHO target cell candidate(s) in the measurement report that is triggered and transmits the measurement report.

An example of how the configuration may be encoded is shown below for when the configuration is part of an event triggered measurement reporting configuration. In the example, the flag is applicable for any events (A1, A2, A3, A4, A5, A6, B1 or B2) but another variant may be to define that only for a subset of events, e.g., A3, A4 and A5.

```
-- ASN1START
-- TAG-REPORTCONFIGNR-START
ReportConfigNR ::=                   SEQUENCE {
  reportType                         CHOICE {
    periodical
PeriodicalReportConfig,
    eventTriggered
EventTriggerConfig,
    ...,
    reportCGI                        ReportCGI,
    [[
    reportSFTD                       ReportSFTD-NR
    ]]
  }
}
ReportCGI ::=                        SEQUENCE {
  cellForWhichToReportCGI            PhysCellId,
  ...
}
ReportSFTD-NR ::=                    SEQUENCE {
  reportSFTD-Meas                    BOOLEAN,
  reportRSRP                         BOOLEAN,
  ...
}
EventTriggerConfig::=                SEQUENCE {
  eventId                            CHOICE {
    eventA1                          SEQUENCE {
      a1-Threshold
MeasTriggerQuantity,
      reportOnLeave                  BOOLEAN,
      hysteresis                     Hysteresis,
      timeToTrigger
TimeToTrigger
    },
    eventA2                          SEQUENCE {
      a2-Threshold
MeasTriggerQuantity,
      reportOnLeave                  BOOLEAN,
      hysteresis                     Hysteresis,
      timeToTrigger
TimeToTrigger
    },
    eventA3                          SEQUENCE {
      a3-Offset
MeasTriggerQuantityOffset,
      reportOnLeave                  BOOLEAN,
      hysteresis                     Hysteresis,
      timeToTrigger
TimeToTrigger,
      useWhiteCellList               BOOLEAN
    },
    eventA4                          SEQUENCE {
      a4-Threshold
MeasTriggerQuantity,
      reportOnLeave                  BOOLEAN,
      hysteresis                     Hysteresis,
      timeToTrigger
TimeToTrigger,
      useWhiteCellList               BOOLEAN
    },
    eventA5                          SEQUENCE {
      a5-Threshold1
```

-continued

```
MeasTriggerQuantity,
    a5-Threshold2
MeasTriggerQuantity,
    reportOnLeave              BOOLEAN,
    hysteresis                 Hysteresis,
    timeToTrigger
TimeToTrigger,
    useWhiteCellList           BOOLEAN
},
    eventA6                    SEQUENCE {
    a6-Offset
MeasTriggerQuantityOffset,
    reportOnLeave              BOOLEAN,
    hysteresis                 Hysteresis,
    timeToTrigger
TimeToTrigger,
    useWhiteCellList           BOOLEAN
},
...
},
rsType                         NR-RS-Type,
reportInterval                 ReportInterval,
reportAmount                   ENUMERATED {r1, r2,
r4, r8, r16, r32, r64, infinity},
reportQuantityCell             MeasReportQuantity,
maxReportCells                 INTEGER
(1..maxCellReport),
reportQuantityRS-Indexes       MeasReportQuantity
OPTIONAL, -- Need R
maxNrofRS-IndexesToReport      INTEGER
(1..maxNrofIndexesToReport)        OPTIONAL, -
- Need R
includeBeamMeasurements        BOOLEAN,
includeChoMeasurements         BOOLEAN,
reportAddNeighMeas             ENUMERATED {setup}
OPTIONAL, -- Need R
...
}
```

The example below is for when the configuration is part of a periodical measurement reporting configuration.

```
PeriodicalReportConfig ::=     SEQUENCE {
    rsType                     NR-RS-Type,
    reportInterval             ReportInterval,
    reportAmount               ENUMERATED {r1, r2,
r4, r8, r16, r32, r64, infinity},
    reportQuantityCell         MeasReportQuantity,
    maxReportCells             INTEGER
(1..maxCellReport),
    reportQuantityRS-Indexes   MeasReportQuantity
OPTIONAL, -- Need R
    maxNrofRS-IndexesToReport  INTEGER
(1..maxNrofIndexesToReport)        OPTIONAL, -
- Need R
    includeBeamMeasurements    BOOLEAN,
    useWhiteCellList           BOOLEAN,
    includeChoMeasurements     BOOLEAN,
...
}
```

In some embodiments, the configuration may be granular indications (e.g., in reportConfig of ReportConfigNR IE) to indicate what specific measurement information of CHO target candidate are to be included such as: indication to include beam measurements, indication to include beam indexes, indication to include a specific measurement quantity (RSRP, RSRQ, SINR, RSRQ and RSRQ, RSRQ and SINR, RSRP, RSRQ and SINR, etc.), indication to include a maximum number of cells (UE performs sorting of CHO candidate cells according to a criteria). Thus, upon receiving the configuration and upon detecting the triggering of a measurement report associated to that configuration, the UE includes measurement information of CHO target cell candidate(s) (according to the granular configuration) in the measurement report that is triggered and transmits the measurement report.

An example encoding is shown below for when the configuration is part of an event triggered measurement reporting configuration. In the example, the flag is applicable for any events (A1, A2, A3, A4, A5, A6, B1 or B2) but another variant may define the configuration only for a subset of events, e.g., A3, A4 and A5.

```
EventTriggerConfig::=          SEQUENCE {
    eventId                    CHOICE {
        eventA1                SEQUENCE {
        a1-Threshold
    MeasTriggerQuantity,
        reportOnLeave          BOOLEAN,
        hysteresis             Hysteresis,
        timeToTrigger
    TimeToTrigger
        },
        eventA2                SEQUENCE {
        a2-Threshold
    MeasTriggerQuantity,
        reportOnLeave          BOOLEAN,
        hysteresis             Hysteresis,
        timeToTrigger
    TimeToTrigger
        },
        eventA3                SEQUENCE {
        a3-Offset
    MeasTriggerQuantityOffset,
        reportOnLeave          BOOLEAN,
        hysteresis             Hysteresis,
        timeToTrigger
    TimeToTrigger,
        useWhiteCellList       BOOLEAN
        },
        eventA4                SEQUENCE {
        a4-Threshold
    MeasTriggerQuantity,
        reportOnLeave          BOOLEAN,
        hysteresis             Hysteresis,
        timeToTrigger
    TimeToTrigger,
        useWhiteCellList       BOOLEAN
        },
        eventA5                SEQUENCE {
        a5-Threshold1
    MeasTriggerQuantity,
        a5-Threshold2
    MeasTriggerQuantity,
        reportOnLeave          BOOLEAN,
        hysteresis             Hysteresis,
        timeToTrigger
    TimeToTrigger,
        useWhiteCellList       BOOLEAN,
        },
        eventA6                SEQUENCE {
        a6-Offset
    MeasTriggerQuantityOffset,
        reportOnLeave          BOOLEAN,
        hysteresis             Hysteresis,
        timeToTrigger
    TimeToTrigger,
        useWhiteCellList       BOOLEAN
        },
        ...
    },
    rsType                     NR-RS-Type,
    reportInterval             ReportInterval,
    reportAmount               ENUMERATED {r1, r2,
r4, r8, r16, r32, r64, infinity},
    reportQuantityCell         MeasReportQuantity,
    maxReportCells             INTEGER
(1..maxCellReport),
    reportQuantityRS-Indexes   MeasReportQuantity
OPTIONAL, -- Need R
    maxNrofRS-IndexesToReport  INTEGER
(1..maxNrofIndexesToReport)        OPTIONAL, -
```

```
- Need R
    includeBeamMeasurements        BOOLEAN,
    includeChoMeasurements         IncludeChoMeasurements
OPTIONAL,  -- Need R,
    reportAddNeighMeas             ENUMERATED {setup}
OPTIONAL,  -- Need R
    ...
}
IncludeChoMeasurements ::        SEQUENCE {
    reportQuantityCellCho
MeasReportQuantity,
    maxReportCellsCho              INTEGER
(1..maxCellReport),
    reportQuantityRS-IndexesCho
MeasReportQuantity
```

```
    OPTIONAL,  -- Need R
        includeBeamMeasurementsCho     BOOLEAN,
    }
```

In some embodiments, the UE receives the configuration as part of the conditional handover configuration, e.g., in an RRCReconfiguration containing a per target candidate cell RRCReconfiguration message to be stored and associated to trigger/execution conditions.

An example encoding is shown below for the case of a single flag. One variant is when the flag indication indicates that whenever a measurement report is triggered and is to be transmitted, the UE includes measurements for that specific target cell candidate. Another variant is when the flag indication indicates that whenever a measurement report associated to at least one of the trigger conditions (i.e., one of the associated MeasId(s)) is triggered and is to be transmitted, the UE includes measurements for that specific target cell candidate.

```
-- ASN1START
-- TAG-CONDRECONFIGURATIONPERTARGETCANDIDATE-START
CondReconfigurationPerTargetCandidate ::=    SEQUENCE {
    rrcReconfigurationToApply              OCTET STRING (CONTAINING
RRCReconfiguration)
    triggerCondition                       SEQUENCE (SIZE (1..
maxNrofTriggerCond)) OF MeasId
    ...
    includeChoMeasurements                 BOOLEAN
}
-- TAG- CONDRECONFIGURATIONPERTARGETCANDIDATE-STOP
-- ASN1STOP
```

An example encoding for granular configuration is illustrated below. One variant is when the indication indicates that whenever a measurement report is triggered and is to be transmitted, the UE includes measurements for that specific target cell candidate according to the granular configuration. Another variant is when the indication indicates that whenever a measurement report associated to at least one of the trigger conditions (i.e., one of the associated MeasId(s)) is triggered and is to be transmitted, the UE includes measurements for that specific target cell candidate according to the granular configuration.

```
-- ASN1START
-- TAG-CONDRECONFIGURATIONPERTARGETCANDIDATE-START
CondReconfigurationPerTargetCandidate ::=    SEQUENCE {
    rrcReconfigurationToApply              OCTET STRING (CONTAINING
RRCReconfiguration)
    triggerCondition                       SEQUENCE (SIZE (1..
maxNrofTriggerCond)) OF MeasId
    ...
includeChoMeasurements                     IncludeChoMeasurements
OPTIONAL,  -- Need R,
}
IncludeChoMeasurements ::                  SEQUENCE {
    reportQuantityCellCho
MeasReportQuantity,
    maxReportCellsCho                      INTEGER
(1..maxCellReport),
    reportQuantityRS-IndexesCho
MeasReportQuantity
OPTIONAL,  -- Need R
    includeBeamMeasurementsCho             BOOLEAN,
}
-- TAG- CONDRECONFIGURATIONPERTARGETCANDIDATE-STOP
-- ASN1STOP
```

In some embodiments, a measId used for CHO configuration (i.e., triggering/execution conditions) contains a configuration indicating the monitoring for a measurement report. A CHO configuration per target candidate includes at least one measurement identity and an RRCReconfiguration in a container (in the case of NR) that is stored while the UE monitors the execution/trigger conditions associated to the measurement identities.

In particular embodiments, each measurement identity included in a CHO configuration is associated to a reportConfig of ReportConfigNR IE associated for CHO (e.g., has a reportType set to 'CHO' or equivalent). In these embodiments, the measId configuration includes an indication for the measId that indicates to the UE that a measurement report is to be transmitted and that the UE includes CHO target candidate information in that measurement report (controlled by the same indication or yet a specific indication).

The transmission of a measurement report for the measId (also associated to a target candidate CHO) may be controlled by a rule, e.g., if the configuration is included the UE considers as applicable cells any cells in the associated frequency (i.e., measObject associated to that measId), i.e., not only the cells for which CHO is configured and are associated to that measId. There could be an exception for black listed cells, i.e., the rule is applicable for any cell except the cells in the black list. In another variant, the indication contains more detailed configuration for the reporting of these cells, e.g., different thresholds compared to the CHO thresholds, possibly equivalent to the thresholds of early measurement reports the enabled the network to configure the CHO candidates in the first place.

An example of the signaling is shown below.

```
ReportConfigNR ::=                        SEQUENCE {
  reportType                              CHOICE {
    periodical
PeriodicalReportConfig,
    eventTriggered
EventTriggerConfig,
    ...,
    reportCGI                             ReportCGI,
    [[
    reportSFTD                            ReportSFTD-NR
    ]],
    [[
    condReconfigurationTrigger            CondTriggerConfig,
    ]]
  }
}
ReportCGI ::=                             SEQUENCE {
  cellForWhichToReportCGI                 PhysCellId,
  ...
}
ReportSFTD-NR ::=                         SEQUENCE {
  reportSFTD-Meas                         BOOLEAN,
  reportRSRP                              BOOLEAN,
  ...
}
CondTriggerConfig::=                      SEQUENCE {
  eventId                                 CHOICE {
    eventA3                               SEQUENCE {
      a3-Offset
MeasTriggerQuantityOffset,
      timeToTrigger
TimeToTrigger,
    },
    eventA5                               SEQUENCE {
      a5-Threshold1
MeasTriggerQuantity,
      a5-Threshold2
MeasTriggerQuantity,
      timeToTrigger
TimeToTrigger,
    },
    ...
  },
  rsType                                  NR-RS-Type,
  transmitMeasurementReport               MeasReportConfig
  includeChoMeasurements                  BOOLEAN
  ...
}
```

Another example may include the following.

```
ReportConfigNR ::=                        SEQUENCE {
  reportType                              CHOICE {
    periodical
PeriodicalReportConfig,
    eventTriggered
EventTriggerConfig,
    ...,
    reportCGI                             ReportCGI,
    [[
    reportSFTD                            ReportSFTD-NR
    ]],
    [[
    condReconfigurationTrigger            CondTriggerConfig,
    ]]
  }
}
ReportCGI ::=                             SEQUENCE {
  cellForWhichToReportCGI                 PhysCellId,
  ...
}
ReportSFTD-NR ::=                         SEQUENCE {
  reportSFTD-Meas                         BOOLEAN,
  reportRSRP                              BOOLEAN,
  ...
}
CondTriggerConfig::=                      SEQUENCE {
  eventId                                 CHOICE {
    eventA3                               SEQUENCE {
      a3-Offset
MeasTriggerQuantityOffset,
      timeToTrigger
TimeToTrigger,
      transmitMeasurementReport           MeasReportConfig
      includeChoMeasurements              BOOLEAN
    },
    eventA5                               SEQUENCE {
      a5-Threshold1
MeasTriggerQuantity,
      a5-Threshold2
MeasTriggerQuantity,
      timeToTrigger
TimeToTrigger,
      transmitMeasurementReport           MeasReportConfig
      includeChoMeasurements              BOOLEAN
    },
    ...
  },
  rsType                                  NR-RS-Type,
  ...
}
```

For example, a UE may be configured with a MeasId-1 where the associated reportConfig has CHO as its trigger type (e.g., reportType in ReportConfigNR) and MeasObjectNR is related to SSB frequency Fx. The same MeasId-1 can be associated to one or multiple CHO target cell candidates in the same frequency Fx (e.g., C0, C1, C2). Then, in some embodiments, ReportConfigNR contains an indication for transmitting a measurement report when a different cell in the same frequency C3 on Fx fulfils the CHO condition. The measurement report for MeasId-1 may include measurement information of CHO target cell candidate (e.g., measurement information of C0, C1, C2 on Fx), which can be controlled by another indication or by the same indication.

Some embodiments include signaling for CHO measurement information in a measurement report. In one example, CHO measurement information can be included in a measurement report as follows:

| MeasurementReport message |
| --- |
| -- ASN1START |
| -- TAG-MEASUREMENTREPORT-START |
| MeasurementReport ::=     SEQUENCE { |
|   criticalExtensions     CHOICE { |
|     measurementReport     MeasurementReport-IEs, |
|     criticalExtensionsFuture     SEQUENCE { } |
|   } |
| } |
| MeasurementReport-IEs ::=     SEQUENCE { |
|   measResults     MeasResults, |
|   lateNonCriticalExtension     OCTET STRING OPTIONAL, |
|   nonCriticalExtension     SEQUENCE { } OPTIONAL |
| } |
| -- TAG-MEASUREMENTREPORT-STOP |
| -- ASN1STOP |

The IE MeasResults covers measured results for intra-frequency, inter-frequency, and inter-RAT mobility.

| MeasResults information element |
| --- |
| -- ASN1START |
| -- TAG-MEASRESULTS-START |
| MeasResults ::=     SEQUENCE { |
|   measId     MeasId, |
|   measResultServingMOList     MeasResultServMOList, |
|   measResultNeighCells     CHOICE { |
|     measResultListNR     MeasResultListNR, |
|     ...., |
|     measResultListEUTRA     MeasResultListEUTRA |
|   } |
| OPTIONAL, |
| ..., |
| [[ |
|   measResultServFreqListEUTRA-SCG     MeasResultServFreqListEUTRA-SCG OPTIONAL, |
|   measResultServFreqListNR-SCG     MeasResultServFreqListNR-SCG OPTIONAL, |
|   measResultSFTD-EUTRA     MeasResultSFTD-EUTRA OPTIONAL, |
|   measReultsSFTD-NR     MeasResultCellSFTD-NR OPTIONAL |
| ]] |

| MeasResults information element |
| --- |
| [[ |
|   measResult-CHO-Candidates     MeasResultListNR OPTIONAL, |
| ]] |
| } |

Some embodiments include methods in a network node. For example, in certain embodiments the network may define a rule for when the UE should send a MeasurementReport when the configured measurement condition is fulfilled. The rule may be configurable.

In some embodiments, the network node may configure a UE with two measIDs with the same measurement object, but with two reportConfigs (with the same triggers), one for CHO and one for measurement report. The configuration for measurement report may have a black list for CHO candidates to avoid conflicts with MeasurementReport and CHO execution, i.e. MeasurementReport shall not be triggered when CHO is executed. The configuration of the measurement report can be used to find new CHO candidates or enhanced non-triggered CHO candidates can be included in the MeasurementReport.

In some embodiments, a network node (also referred to as a source gNB) for the handling of measurement configurations and reporting upon conditional mobility configuration (e.g., conditional handover) may be configured to perform the following steps. For example, the network node may configure a UE with a measurement configuration. The network node may configure the UE with CHO configuration containing CHO candidate cells and triggering conditions.

The network node may receive measurements of CHO candidates the UE is monitoring in triggered MeasurementReports. The network node receives measurements of CHO candidates also if it is not the first cell that triggers the event.

In some embodiments, the network node defines a rule for including CHO candidates in MeasurementReport, e.g., that if CHO is configured, the UE shall always include measurements of CHO candidates.

In some embodiments, the network node configures if the UE should include CHO candidates the UE is monitoring in the triggered MeasurementReport. The configuration may consist of a flag (implemented as BOOLEAN, an ON/OFF indication, TRUE/FALSE, etc.). The configuration may also be enhanced and consist of defined cases when the UE shall include the CHO candidates, e.g., when above/below certain thresholds. The cases when CHO candidates should be included may also be defined as a rule described in the specification, e.g. that if CHO is configured the UE shall include measurements of CHO candidates if the sorting quality has changed.

Below is an example of how some embodiments may be implemented in procedure text in TS 38.331:

```
****************************************************
5.5.4  Measurement report triggering
5.5.4.1 General
If AS security has been activated successfully, the UE shall:
    1>for each measId included in the measIdList within VarMeasConfig:
        2> if the corresponding reportConfig includes a reportType set to eventTriggered or periodical:
            3> if the corresponding measObject concerns NR:
                4> if the eventA1 or eventA2 is configured in the corresponding reportConfig:
                    5> consider only the serving cell to be applicable;
                4> if the eventA3 or eventA5 is configured in the corresponding reportConfig.
                    5> if a serving cell is associated with a measObjectNR and neighbours are associated with
                        another measObjectNR, consider any serving cell associated with the other measObjectNR
                        to be a neighbouring cell as well;
```

4> if corresponding reportConfig includes reportType set to periodical; or
    4> for measurement events other than eventA1 or eventA2:
        5> if useWhiteCellList is set to true:
          Observation 1
            6> consider any neighbouring cell detected based on parameters in the
                associated measObjectNR to be applicable when the concerned cell is included in the
              whiteCells ToAddModList defined within the VarMeasConfig for this measId;
        5> else:
          Observation 2
            6> consider any neighbouring cell detected based on parameters in the
                associated measObjectNR to be applicable when the concerned cell is not included in
              the blackCells ToAddModList defined within the VarMeasConfig for this measId;
  3> else if the corresponding measObject concerns E-UTRA:
    4> if eventB1 or eventB2 is configured in the corresponding reportConfig.
        5> consider a serving cell, if any, on the associated E-UTRA frequency as neighbour cell;
    4> else:
        5> consider any neighbouring cell detected on the associated frequency to be applicable when
            the concerned cell is not included in the blackCells ToAddModListEUTRAN defined
            within the VarMeasConfig for this measId;
2> else if the corresponding reportConfig includes a reportType set to reportCGI:
  3> consider the cell detected on the associated measObject which has a physical cell identity
      matching the value of the cellForWhich ToReportCGI included in the corresponding reportConfig
      within the VarMeasConfig to be applicable;
2> else if the corresponding reportConfig includes a reportType set to reportSFTD:
  3> if the corresponding measObject concerns NR:
    4> if the reportSFTD-Meas is set to true:
        5> consider the NR PSCell to be applicable;
  3> else if the corresponding measObject concerns E-UTRA:
    4> if the reportSFTD-Meas is set to true:
        5> consider the E-UTRA PSCell to be applicable;
2> else if the corresponding reportConfig includes a reportType set to condReconfiguration Trigger.
  3> consider as a neighbouring cell the cell which has a physical cell identity matching the value
      indicated in the ServingCellConfigCommon in the stored RRCReconfiguration associated to the
      corresponding measId within the VarConditionalReconfiguration;
Editor's Note: FFS How to define an applicable/neighbouring cell for the monitoring of CHO triggering.
  2> if the reportType is set to eventTriggered and if the entry condition applicable for this event, i.e. the
      event corresponding with the eventId of the corresponding reportConfig within VarMeasConfig, is
      fulfilled for one or more applicable cells for all measurements after layer 3 filtering taken during
      time ToTrigger defined for this event within the VarMeasConfig, while the VarMeasReportList
      does no include a measurement reporting entry for this measId (a first cell triggers the event):
    3> include a measurement reporting entry within the VarMeasReportList for this measId;
    3> set the numberOfReportsSent defined within the VarMeasReportList for this measId to 0;
    3> include the concerned cell(s) in the cells TriggeredList defined within the VarMeasReportList for
        this measId;
    3> if includeChoMeasurements is set to 'TRUE';
      4> include the CHO target candidates cell(s) in the measResult-CHO-Candidates defined within
          the VarMeasReportList for this measId;
    3> initiate the measurement reporting procedure, as specified in 5.5.5;
  2> else if the reportType is set to eventTriggered and if the entry condition applicable for this event, i.e.
      the event corresponding with the eventId of the corresponding reportConfig within VarMeasConfig,
      is fulfilled for one or more applicable cells not included in the cells TriggeredList for all measurements
      after layer 3 filtering taken during time ToTrigger defined for this event within the VarMeasConfig (a
      subsequent cell triggers the event):
    3> set the numberOfReportsSent defined within the VarMeasReportList for this measId to 0;
    3> include the concerned cell(s) in the cells TriggeredList defined within the VarMeasReportList for
        this measId;
    3> if includeChoMeasurements is set to 'TRUE';
      4> include the CHO target candidates cell(s) in the measResult-CHO-Candidates defined within
          the VarMeasReportList for this measId;
    3> initiate the measurement reporting procedure, as specified in 5.5.5;
  2> else if the reportType is set to eventTriggered and if the leaving condition applicable for this event is
      fulfilled for one or more of the cells included in the cells TriggeredList defined within the
      VarMeasReportList for this measId for all measurements after layer 3 filtering taken during
      time ToTrigger defined within the VarMeasConfig for this event:
    3> remove the concerned cell(s) in the cells TriggeredList defined within the VarMeasReportList for
        this measId;
    3> if reportOnLeave is set to true for the corresponding reporting configuration:
    3> if includeChoMeasurements is set to 'TRUE';
      4> include the CHO target candidates cell(s) in the measResult-CHO-Candidates defined within
          the VarMeasReportList for this measId;
      4> initiate the measurement reporting procedure, as specified in 5.5.5;
    3> if the cells TriggeredList defined within the VarMeasReportList for this measId is empty:
      4> remove the measurement reporting entry within the VarMeasReportList for this measId;
      4> stop the periodical reporting timer for this measId, if running;
  2> if reportType is set to periodical and if a (first) measurement result is available:
    3> include a measurement reporting entry within the VarMeasReportList for this measId;
    3> set the numberOfReportsSent defined within the VarMeasReportList for this measId to 0;
    3> if includeChoMeasurements is set to 'TRUE';

- 4> include the CHO target candidates cell(s) in the measResult-CHO-Candidates defined within the VarMeasReportList for this measId;
- 3> if the reportAmount exceeds 1:
  - 4> initiate the measurement reporting procedure, as specified in 5.5.5, immediately after the quantity to be reported becomes available for the NR SpCell;
- 3> else (i.e. the reportAmount is equal to 1):
  - 4> initiate the measurement reporting procedure, as specified in 5.5.5, immediately after the quantity to be reported becomes available for the NR SpCell and for the strongest cell among the applicable cells;
- 2> upon expiry of the periodical reporting timer for this measId:
  - 3> initiate the measurement reporting procedure, as specified in 5.5.5.
- 2> if the corresponding reportConfig includes a reportType is set to reportSFTD:
  - 3> if include ChoMeasurements is set to 'TRUE':
    - 4> include the CHO target candidates cell(s) in the measResult-CHO-Candidates defined within the VarMeasReportList for this measId;
  - 3> if the corresponding measObject concerns NR:
    - 4> initiate the measurement reporting procedure, as specified in 5.5.5, immediately after the quantity to be reported becomes available for the pair of PCell and NR PSCell or the maximal measurement reporting delay as specified in TS 38.133 [14];
  - 3> else if the corresponding measObject concerns E-UTRA:
    - 4> initiate the measurement reporting procedure, as specified in 5.5.5, immediately after the quantity to be reported becomes available for the pair of PCell and E-UTRA PSCell or the maximal measurement reporting delay as specified in TS 38.133 [14];
- 2> if the reportType is set to condReconfiguration Trigger and if the entry condition applicable for this event, i.e. the event corresponding with the eventId of the corresponding reportConfig within VarMeasConfig, is fulfilled for the applicable cell for all measurements after layer 3 filtering taken during time ToTrigger defined for this event within the VarMeasConfig:
  - 3> initiate the conditional reconfiguration execution procedure, as specified in 5.3.5.x.4;
- 2> if reportType is set to reportCGI:
  - 3> if includeChoMeasurements is set to 'TRUE':
    - 4> include the CHO target candidates cell(s) in the measResult-CHO-Candidates defined within the VarMeasReportList for this measId;
  - 3> if the UE acquired the SIB1 or SystemInformationBlockType1 for the requested cell; or
  - 3> if the UE detects that the requested NR cell is not transmitting SIB1 (see TS 38.213 [13], clause 13):
    - 4> stop timer T321;
    - 4> include a measurement reporting entry within the VarMeasReportList for this measId;
    - 4> set the numberOfReportsSent defined within the VarMeasReportList for this measId to 0;
    - 4> initiate the measurement reporting procedure, as specified in 5.5.5;
- 2> upon the expiry of T321 for this measId:
  - 3> include a measurement reporting entry within the VarMeasReportList for this measId;
  - 3> set the numberOfReportsSent defined within the VarMeasReportList for this measId to 0;
  - 3> initiate the measurement reporting procedure, as specified in 5.5.5.

Figure 3:
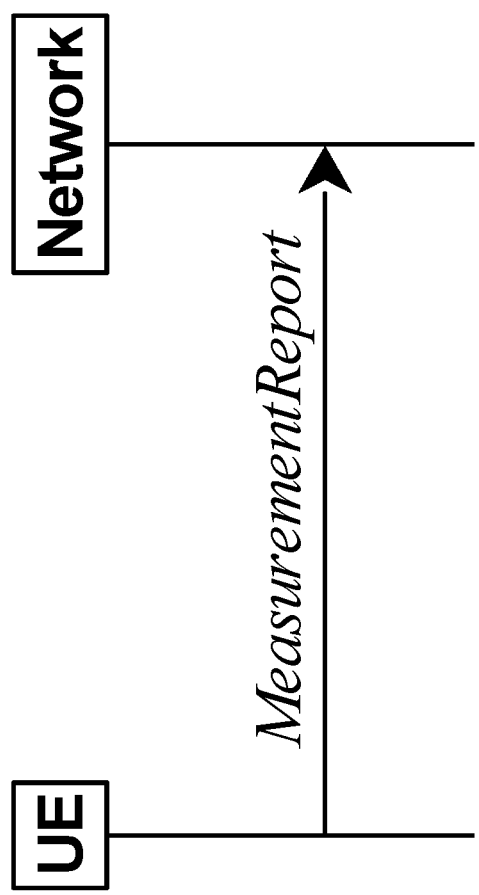
FIG. 3 is a sequence diagram illustrating measurement reporting.

5.5.5 Measurement reporting
5.5.5.1 General
FIG.-5.5.5.1-1 is reproduced as FIG. 3.
The purpose of this procedure is to transfer measurement results from the UE to the network. The UE shall initiate this procedure only after successful AS security activation.
For the measId for which the measurement reporting procedure was triggered, the UE shall set the measResults within the MeasurementReport message as follows:
- 1> set the measId to the measurement identity that triggered the measurement reporting;
- 1> for each serving cell configured with servingCellMO:
  - 2> if the reportConfig associated with the measId that triggered the measurement reporting includes rsType:
    - 3> if the serving cell measurements based on the rsType included in the reportConfig that triggered the measurement report are available:
      - 4> set the measResultServingCell within measResultServingMOList to include RSRP, RSRQ and the available SINR of the serving cell, derived based on the rsType included in the reportConfig that triggered the measurement report;
  - 2> else:
    - 3> if SSB based serving cell measurements are available:
      - 4> set the measResultServingCell within measResultServingMOList to include RSRP, RSRQ and the available SINR of the serving cell, derived based on SSB;
    - 3> else if CSI-RS based serving cell measurements are available:
      - 4> set the measResultServingCell within measResultServingMOList to include RSRP, RSRQ and the available SINR of the serving cell, derived based on CSI-RS;
- 1> set the servCellId within measResultServingMOList to include each NR serving cell that is configured with servingCellMO, if any;
- 1> if the reportConfig associated with the measId that triggered the measurement reporting includes reportQuantityRS-Indexes and maxNrofRS-Indexes ToReport:
  - 2> for each serving cell configured with servingCellMO, include beam measurement information according to the associated reportConfig as described in 5.5.5.2;
- 1> if the reportConfig associated with the measId that triggered the measurement reporting includes reportAdd NeighMeas:
  - 2> for each measObjectId referenced in the measIdList which is also referenced with servingCellMO, other than the measObjectId corresponding with the measId that triggered the measurement reporting:
        [ . . . ]
- 1> if the reportConfig associated with the measId that triggered the measurement reporting is set to eventTriggered and eventID is set to eventA3, or eventA4, or eventA5, or eventB1, or eventB2:

2> if the UE is in NE-DC and the measurement configuration that triggered this measurement report is associated with the MCG:
                    [. . .]
1> if reportConfig associated with the measId that triggered the measurement reporting is set to eventTriggered and eventID is set to eventA3, or eventA4, or eventA5:
    2> if the UE is in NR-DC and the measurement configuration that triggered this measurement report is associated with the MCG:
                    [. . .]
1> if there is at least one applicable neighbouring cell to report:
    2> if the reportType is set to eventTriggered or periodical:
       3> set the measResultNeighCells to include the best neighbouring cells up to maxReportCells in accordance with the following:
          4> if the reportType is set to eventTriggered:
             5> include the cells included in the cells TriggeredList as defined within the VarMeasReportList for this measId;
             5> include the CHO target candidate cell(s) included in the measResult-CHO-Candidates as defined within the VarMeasReportList for this measId;
          4> else:
             5> include the applicable cells for which the new measurement results became available since the last periodical reporting or since the measurement was initiated or reset;
             5> include the CHO target candidate cell(s) included in the measResult-CHO-Candidates as defined within the VarMeasReportList for this measId;
          4> for each cell that is included in the measResultNeighCells, include the physCellId;
          4> for each cell that is included in the measResult-CHO-Candidates, include the physCellId;
          4> if the reportType is set to eventTriggered or periodical:
             5> for each included cell, include the layer 3 filtered measured results in accordance with the reportConfig for this measId, ordered as follows:
                6> if the measObject associated with this measId concerns NR:
                   7> if rs Type in the associated reportConfig is set to ssb:
                      8> set resultsSSB-Cell within the measResult to include the SS/PBCH block based quantity(ies) indicated in the reportQuantityCell within the concerned reportConfig, in decreasing order of the sorting quantity, determined as specified in 5.5.5.3, i.e. the best cell is included first;
                      8> if reportQuantityRS-Indexes and maxNrofRS-Indexes ToReport are configured, include beam measurement information as described in 5.5.5.2;
                      8> if includeChoMeasurements is included;
                         9> set resultsSSB-Cell within the measResult-CHO-Candidates to include the SS/PBCH block based quantity(ies) indicated in the reportQuantityCell within the concerned reportConfig, in decreasing order of the sorting quantity, determined as specified in 5.5.5.3, i.e. the best cell is included first;
                         9> if reportQuantityRS-Indexes and maxNrofRS-Indexes ToReport are configured, include beam measurement information in measResult-CHO-Candidates as described in 5.5.5.2;
                  7> else if rs Type in the associated reportConfig is set to csi-rs:
                      8> set resultsCSI-RS-Cell within the measResult to include the CSI-RS based quantity(ies) indicated in the reportQuantityCell within the concerned reportConfig, in decreasing order of the sorting quantity, determined as specified in 5.5.5.3, i.e. the best cell is included first;
                      8> if reportQuantityRS-Indexes and maxNrofRS-Indexes ToReport are configured, include beam measurement information as described in 5.5.5.2;
                      8> if includeChoMeasurements is included;
                         9> set resultsCSI-RS-Cell within the measResult-CHO-Candidates to include the CSI-RS based quantity(ies) indicated in the reportQuantityCell within the concerned reportConfig, in decreasing order of the sorting quantity, determined as specified in 5.5.5.3, i.e. the best cell is included first;
                         9> if reportQuantityRS-Indexes and maxNrofRS-Indexes ToReport are configured, include beam measurement information in measResult-CHO-Candidates as described in 5.5.5.2;
                6> if the measObject associated with this meas/d concerns E-UTRA:
                    7> set the measResult to include the quantity(ies) indicated in the reportQuantity within the concerned reportConfigInterRAT in decreasing order of the sorting quantity, determined as specified in 5.5.5.3, i.e. the best cell is included first;
    2> else:
       3> if the cell indicated by cellForWhich ToReportCGI is an NR cell:
          4> if includeChoMeasurements is included:
             5> set resultsCSI-RS-Cell within the measResult-CHO-Candidates to include the CSI-RS based quantity(ies) indicated in the reportQuantityCell within the concerned reportConfig, in decreasing order of the sorting quantity, determined as specified in 5.5.5.3, i.e. the best cell is included first;
             5> if reportQuantityRS-Indexes and maxNrofRS-Indexes ToReport are configured, include beam measurement information in measResult-CHO-Candidates as described in 5.5.5.2;
             5> set resultsSSB-Cell within the measResult-CHO-Candidates to include the SS/PBCH block based quantity(ies) indicated in the reportQuantityCell within the concerned reportConfig, in decreasing order of the sorting quantity, determined as specified in 5.5.5.3, i.e. the best cell is included first;
             5> if reportQuantityRS-Indexes and maxNrofRS-Indexes ToReport are configured, include beam measurement information in measResult-CHO-Candidates as described in 5.5.5.2;

4> if plmn-IdentityInfoList of the cgi-Info for the concerned cell has been obtained:
        5> include the plmn-IdentityInfoList including plmn-IdentityList, trackingAreaCode (if. . .
            available), ranac (if available) and cellIdentity for each entry of the plmn-Identity InfoList,
        5> include frequencyBandList if available;
    4> else if MIB indicates the SIB1 is not broadcast:
        5> include the noSIB1 including the ssb-SubcarrierOffset and pdcch-ConfigSIB1 obtained from
            MIB of the concerned cell;
3> if the cell indicated by cellForWhich ToReportCGI is an E-UTRA cell:
    4> if all mandatory fields of the cgi-Info-EPC for the concerned cell have been obtained:
        5> include in the cgi-Info-EPC the fields broadcasted in E-UTRA
            SystemInformationBlockType1 associated to EPC;
    4> if the UE is E-UTRA/5GC capable and all mandatory fields of the cgi-Info-5GC for the
        concerned cell have been obtained:
        5> include in the cgi-Info-5GC the fields broadcasted in E-UTRA
            SystemInformationBlockType1 associated to 5GC;
    4> if the mandatory present fields of the cgi-Info for the cell indicated by the
        cellForWhich ToReportCGI in the associated measObject have been obtained:
        5> include the freqBandIndicator;
        5> if the cell broadcasts the multiBandInfoList, include the multiBandInfoList,
        5> if the cell broadcasts the freqBandIndicatorPriority, include the freqBandIndicatorPriority;
1> if the corresponding measObject concerns NR:
    2> if the reportSFTD-Meas is set to true within the corresponding reportConfigNR for this measId:
        3> set the measResultSFTD-NR in accordance with the following:
            4> set sfn-OffsetResult and frameBoundaryOffsetResult to the measurement results provided by
                lower layers;
            4> if the reportRSRP is set to true;
                5> set rsrp-Result to the RSRP of the NR PSCell;
            4> if includeChoMeasurements is included:
                5> set resultsCSI-RS-Cell within the measResult-CHO-Candidates to include the CSI-RS
                    based quantity(ies) indicated in the reportQuantityCell within the concerned reportConfig,
                    in decreasing order of the sorting quantity, determined as specified in 5.5.5.3, i.e. the best
                    cell is included first;
                5> if reportQuantityRS-Indexes and maxNrofRS-Indexes ToReport are configured, include
                    beam measurement information in measResult-CHO-Candidates as described in 5.5.5.2;
                5> set results SSB-Cell within the measResult-CHO-Candidates to include the SS/PBCH block
                    based quantity(ies) indicated in the reportQuantityCell within the concerned reportConfig, in
                    decreasing order of the sorting quantity, determined as specified in 5.5.5.3, i.e. the best cell
                    is included first;
                5> if reportQuantityRS-Indexes and maxNrofRS-Indexes ToReport are configured, include
                    beam measurement information in measResult-CHO-Candidates as described in 5.5.5.2;
1> else if the corresponding measObject concerns E-UTRA:
    2> if the reportSFTD-Meas is set to true within the corresponding reportConfigInterRAT for this measId:
        3> set the measResultSFTD-EUTRA in accordance with the following:
            4> set sfn-OffsetResult and frameBoundaryOffsetResult to the measurement results provided by
                lower layers;
            4> if the reportRSRP is set to true;
                5> set rsrp Result-EUTRA to the RSRP of the EUTRA PSCell;
1> increment the numberOfReportsSent as defined within the VarMeasReportList for this measId by 1;
1> stop the periodical reporting timer, if running;
1> if the numberOfReportsSent as defined within the VarMeasReportList for this measId is less than the
    reportAmount as defined within the corresponding reportConfig for this measId:
    2> start the periodical reporting timer with the value of reportInterval as defined within the corresponding
        reportConfig for this measId;
1> else:
    2> if the reportType is set to periodical:
        3> remove the entry within the VarMeasReportList for this measId;
        3> remove this measId from the measIdList within VarMeasConfig;
            4> if includeChoMeasurements is included:
                5> set resultsCSI-RS-Cell within the measResult-CHO-Candidates to include the CSI-RS
                    based quantity(ies) indicated in the reportQuantityCell within the concerned reportConfig,
                    in decreasing order of the sorting quantity, determined as specified in 5.5.5.3, i.e. the best
                    cell is included first;
                5> if reportQuantityRS-Indexes and maxNrofRS-Indexes ToReport are configured, include
                    beam measurement information in measResult-CHO-Candidates as described in 5.5.5.2;
                5> set results SSB-Cell within the measResult-CHO-Candidates to include the SS/PBCH block
                    based quantity(ies) indicated in the reportQuantityCell within the concerned reportConfig, in
                    decreasing order of the sorting quantity, determined as specified in 5.5.5.3, i.e. the best cell
                    is included first;
                5> if reportQuantityRS-Indexes and maxNrofRS-Indexes ToReport are configured, include
                    beam measurement information in measResult-CHO-Candidates as described in 5.5.5.2;
1> if the UE is in (NG)EN-DC:
    2> if SRB3 is configured:
        3> submit the MeasurementReport message via SRB3 to lower layers for transmission, upon which
            the procedure ends;
    2> else:
        3> submit the MeasurementReport message via the E-UTRA MCG embedded in E-UTRA RRC
            message ULInformation TransferMRDC as specified in TS 36.331 [10].

```
1> else if the UE is in NR-DC:
    2> if the measurement configuration that triggered this measurement report is associated with the SCG:
        3> if SRB3 is configured:
            4> submit the MeasurementReport message via SRB3 to lower layers for transmission, upon
                which the procedure ends;
        3> else:
            4> submit the MeasurementReport message via the NR MCG embedded in NR RRC message
                ULInformation TransferMRDC as specified in 5.7.2a.3;
1> else:
    2> submit the MeasurementReport message to lower layers for transmission, upon which the procedure
        ends.
****************************************************************************
```

FIG. 4 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

FIG. 5 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, U IRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6A:
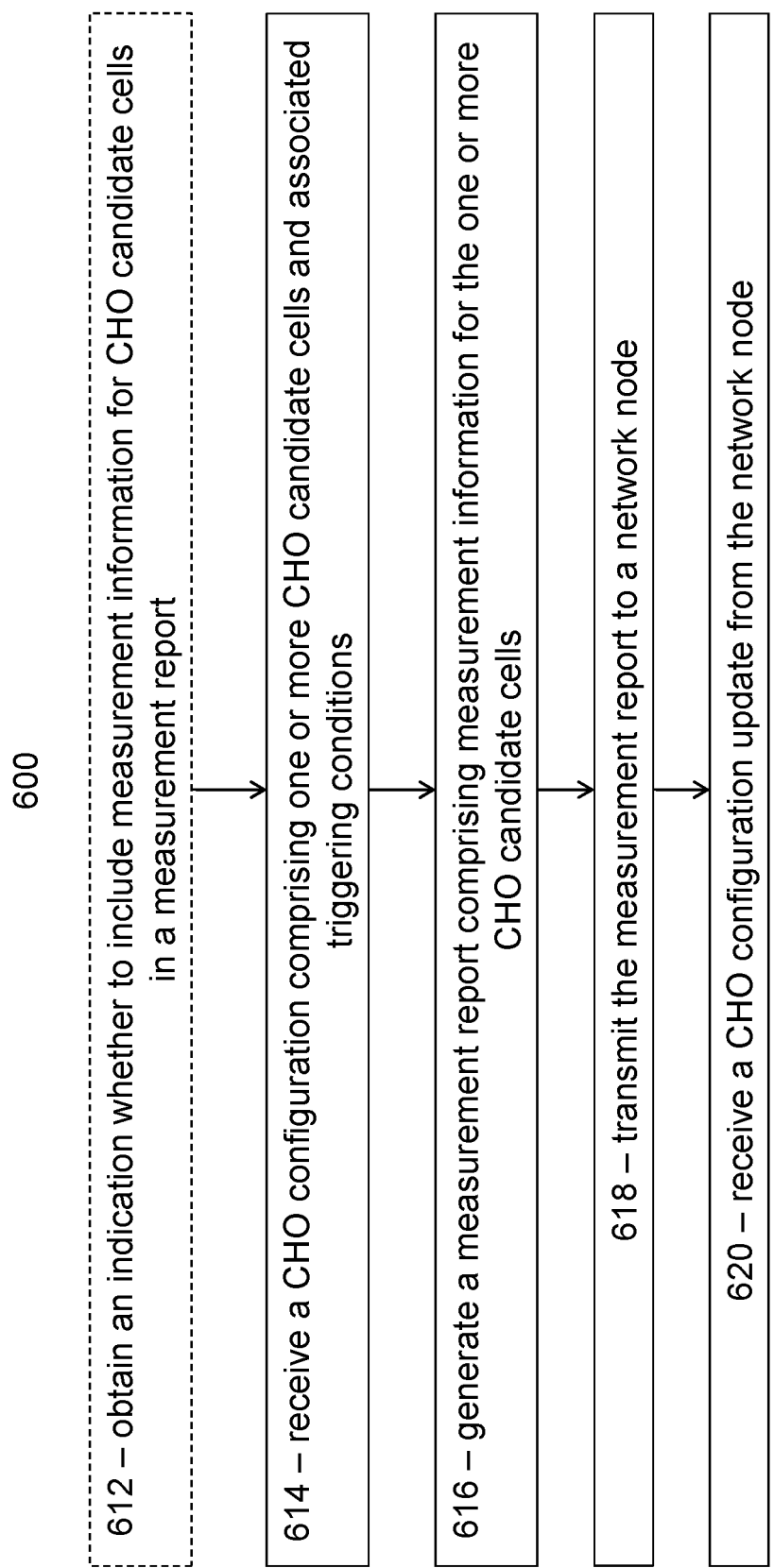
FIG. 6A is flowchart illustrating an example method in a wireless device, according to certain embodiments.

FIG. 6A is a flowchart illustrating an example method in a wireless device, according to certain embodiments. In particular embodiments, one or more steps of FIG. 6A may be performed by wireless device 110 described with respect to FIG. 4.

The method may begin at step 612, where the wireless device (e.g., wireless device 110) obtains an indication that indicates whether the wireless device includes measurement information for the one or more CHO candidate cells in the measurement report. For example, the wireless device may always include measurement information for the one or more CHO candidate cells in the measurement report when CHO is configured for the wireless device, may include measurement information for one or more CHO candidate cells in the measurement report when a measurement for the CHO candidate cell is above or below a preconfigured threshold, or may include measurement information for the one or more CHO candidate cells in the measurement report when a sorting quality has changed. The indication may be obtained as part of the CHO configuration or as part of a measurement configuration. The wireless device may obtain the configuration according to any of the embodiments and examples described herein.

At step 614, the wireless device receives a CHO configuration comprising one or more CHO candidate cells and associated triggering conditions. The wireless device may obtain the configuration according to any of the embodiments and examples described herein.

At step 616, the wireless device generates a measurement report comprising measurement information for the one or more CHO candidate cells. In particular embodiments, the measurement report comprises one or more of: an event triggered measurement report; a periodical measurement report; a cell global identity (CGI) report; a cross-link interference (CLI) report; a system frame number frame timing difference (SFTD) report.; a measurement report configured in a measId that is also used for a CHO configuration trigger condition; and a measurement report configured in a measId for event triggered measurement reporting that is associated to the same measObject as another measId for CHO.

In particular embodiments, the measurement information comprises one or more of: CHO target cell candidate measurements per cell; CHO target cell candidate list that are fulfilling a condition; and beam measurement information for CHO target cell candidates.

The wireless device may generate the measurement report according to any of the embodiments and examples described herein.

At step 618, the wireless device transmits the measurement report to a network node. The network node may use the reported information to modify the CHO configuration according to any of the embodiments and examples described herein (e.g., add, modify, and/or delete candidate cells).

At step 620, the wireless device receives a CHO configuration update from the network node based on the transmitted measurement report.

Modifications, additions, or omissions may be made to method 600 of FIG. 6A. Additionally, one or more steps in the method of FIG. 6A may be performed in parallel or in any suitable order.

Figure 6B:
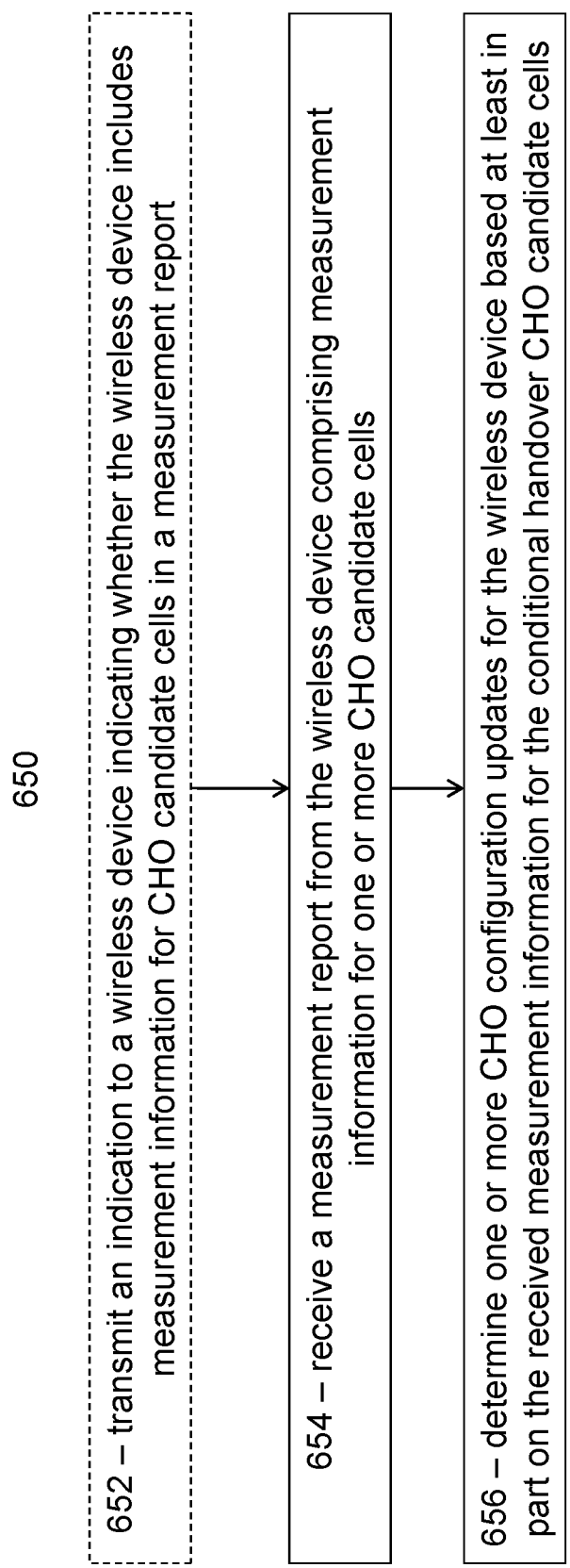
FIG. 6B is flowchart illustrating an example method in a network node, according to certain embodiments.

FIG. 6B is a flowchart illustrating an example method in a network node, according to certain embodiments. In particular embodiments, one or more steps of FIG. 6B may be performed by network node 160 described with respect to FIG. 4.

The method may begin at step 652, where the network node (e.g., network node 160) transmits an indication to the wireless device that indicates whether the wireless device includes measurement information for one or more CHO candidate cells in the measurement report. The indication is described with respect to step 612 of FIG. 6A.

At step 654, the network node receives a measurement report from a wireless device. The measurement report comprises measurement information for one or more CHO candidate cells. The measurement report is described with respect to step 616 of FIG. 6A.

At step 656, the network node determines one or more CHO configuration updates for the wireless device based at least in part on the received measurement information for the one or more conditional handover CHO candidate cells. For example, based on the measurement information the network node may add, remove, or modify candidate cells according to any of the embodiments and examples described herein.

The network node may send the update CHO configuration to the wireless device.

Modifications, additions, or omissions may be made to method 650 of FIG. 6B. Additionally, one or more steps in the method of FIG. 6B may be performed in parallel or in any suitable order.

Figure 7:
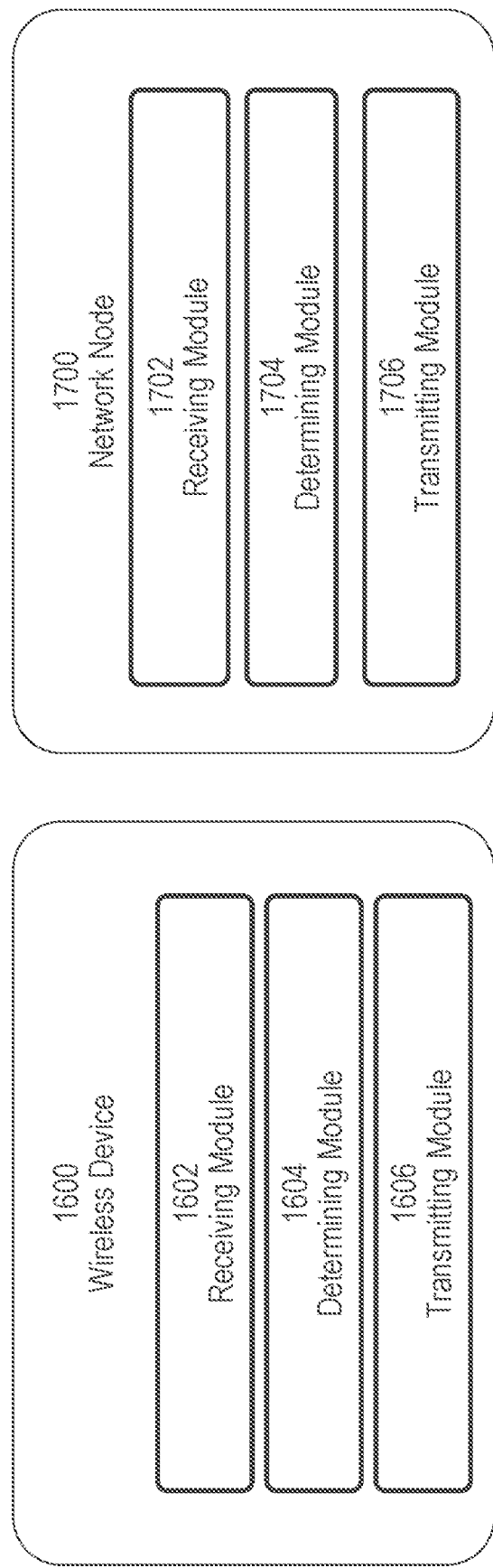
FIG. 7 illustrates a schematic block diagram of a wireless device and a network node in a wireless network, according to certain embodiments.

FIG. 7 illustrates a schematic block diagram of two apparatuses in a wireless network (for example, the wireless network illustrated in FIG. 4). The apparatuses include a wireless device and a network node (e.g., wireless device 110 and network node 160 illustrated in FIG. 4). Apparatuses 1600 and 1700 are operable to carry out the example methods described with reference to FIGS. 6A and 6B, respectively, and possibly any other processes or methods disclosed herein. It is also to be understood that the methods of FIGS. 6A and 6B are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 7, apparatus 1600 includes receiving module 1602 configured to receive measurement and CHO configurations, according to any of the embodiments and examples described herein. Determining module 1604 is configured to determine what measurements to report, according to any of the embodiments and examples described herein. Transmitting module 1606 is configured to transmit a measurement report, according to any of the embodiments and examples described herein.

As illustrated in FIG. 7, apparatus 1700 includes receiving module 1702 configured to receive measurement reports from a wireless device, according to any of the embodiments and examples described herein. Determining module 1704 is configured to determine a CHO update according to any of the embodiments and examples described herein. Transmitting module 1706 is configured to transmit measurement configuration and CHO configuration to a wireless device according to any of the embodiments and examples described herein.

Figure 8:
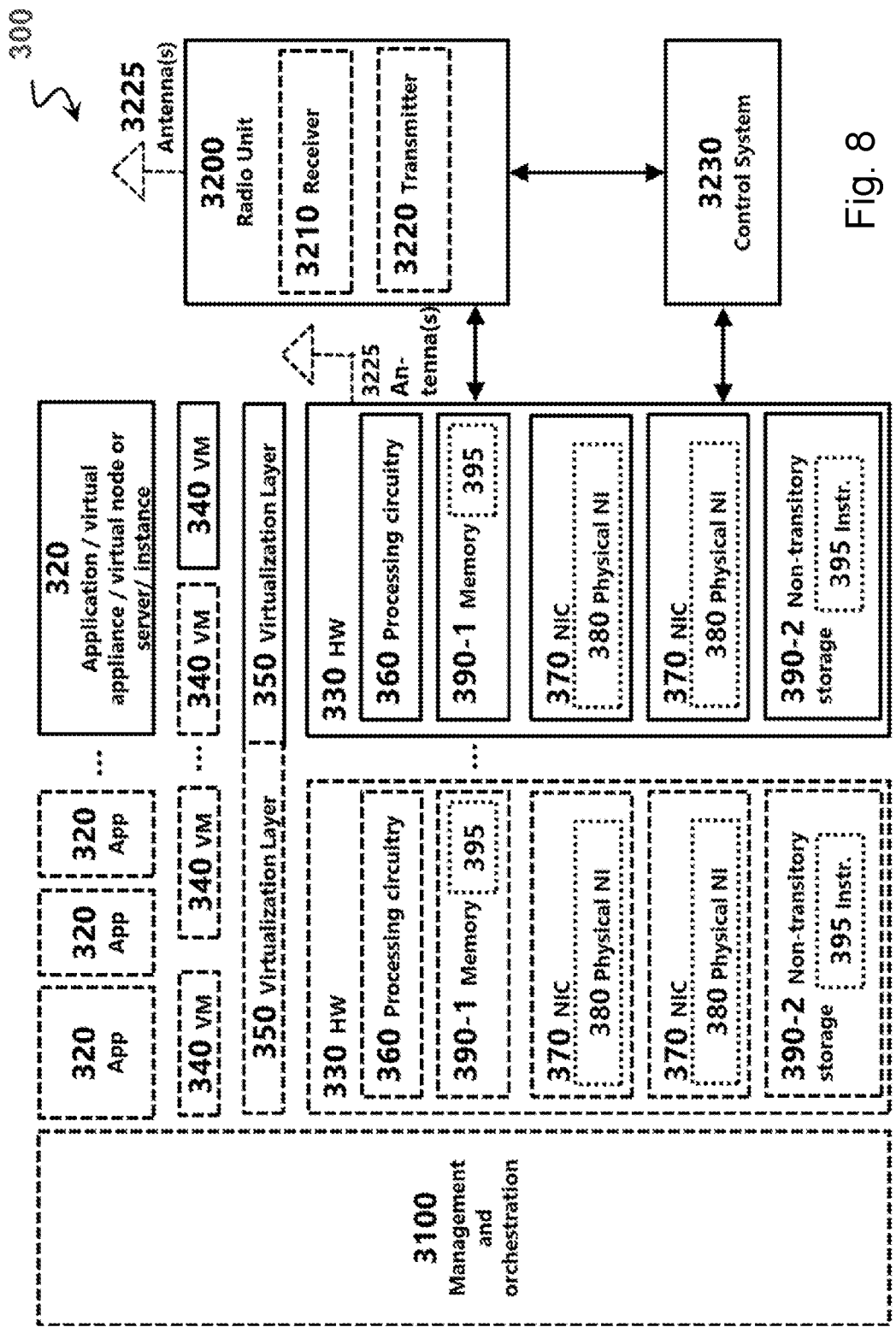
FIG. 8 illustrates an example virtualization environment, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 9:
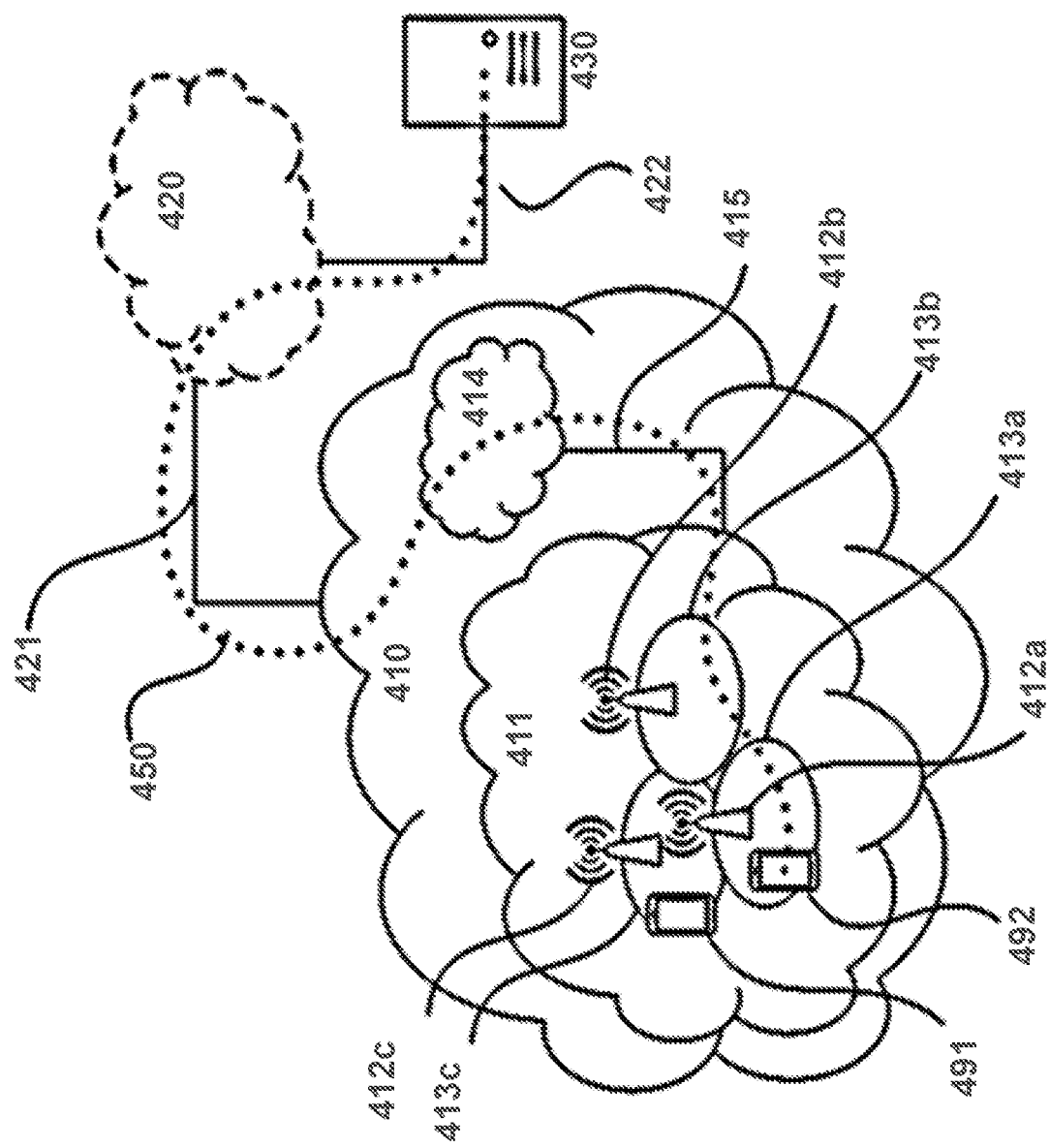
FIG. 9 illustrates an example telecommunication network connected via an intermediate network to a host computer, according to certain embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
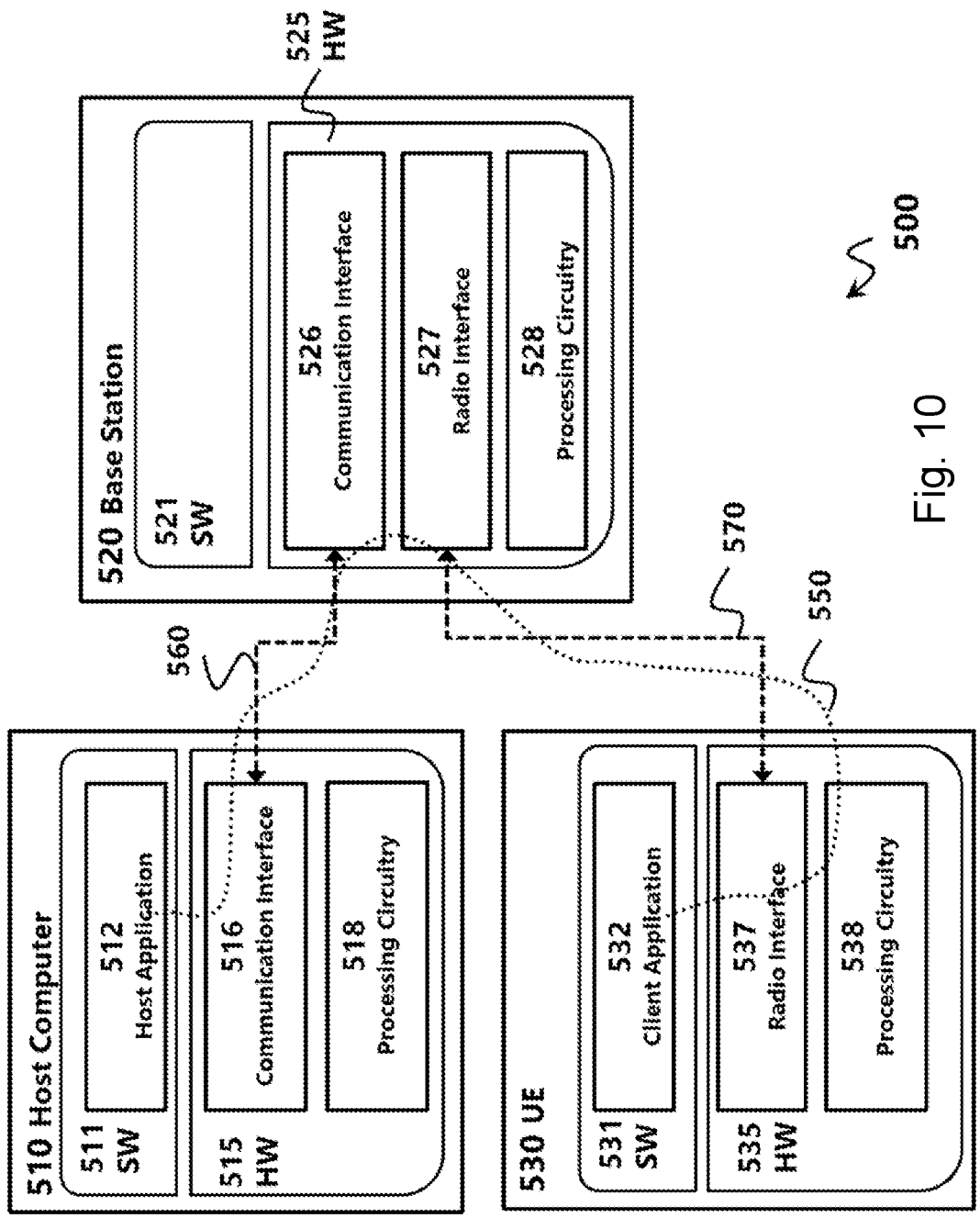
FIG. 10 illustrates an example host computer communicating via a base station with a user equipment over a partially wireless connection, according to certain embodiments.

FIG. 10 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct, or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 10 may be similar or identical to host computer 430, one of base stations 412a, 412b, 412c and one of UEs 491, 492 of FIG. 4, respectively. This is to say, the inner workings of these entities may be as shown in FIG. 10 and independently, the surrounding network topology may be that of FIG. 4.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
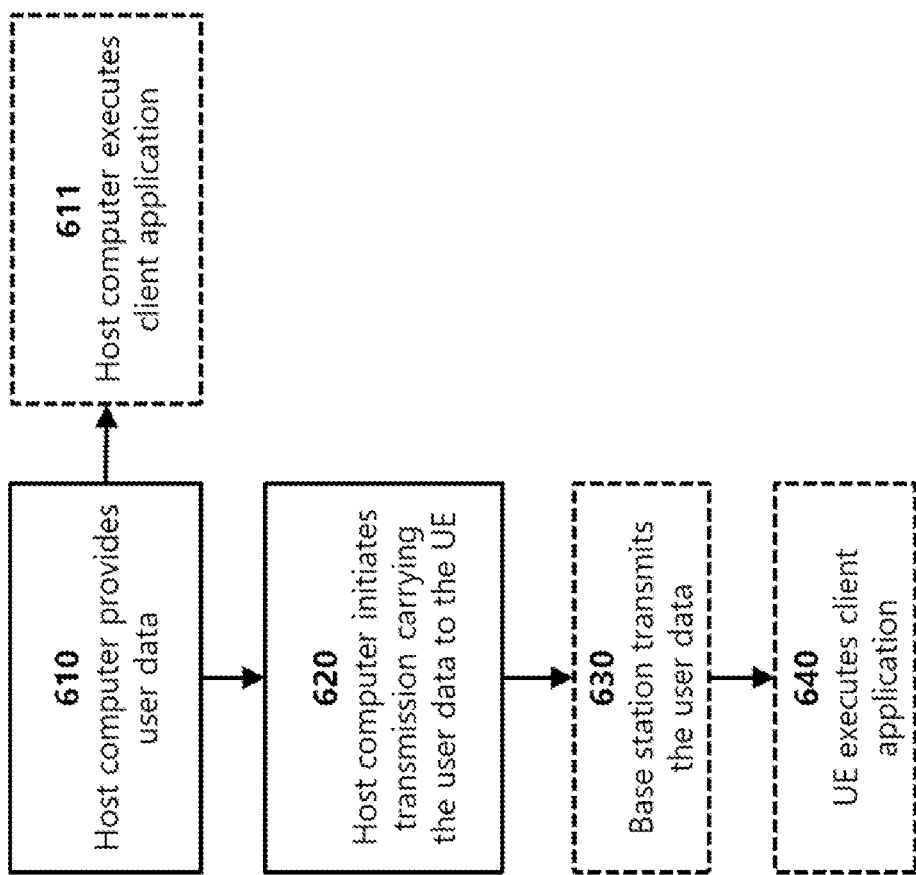
FIG. 11 is a flowchart illustrating a method implemented, according to certain embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
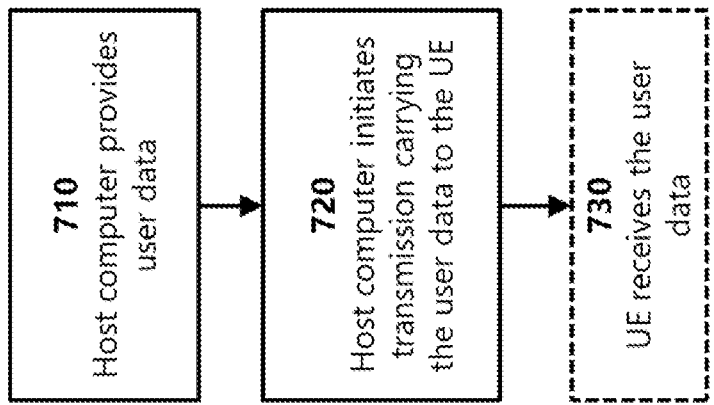
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 13:
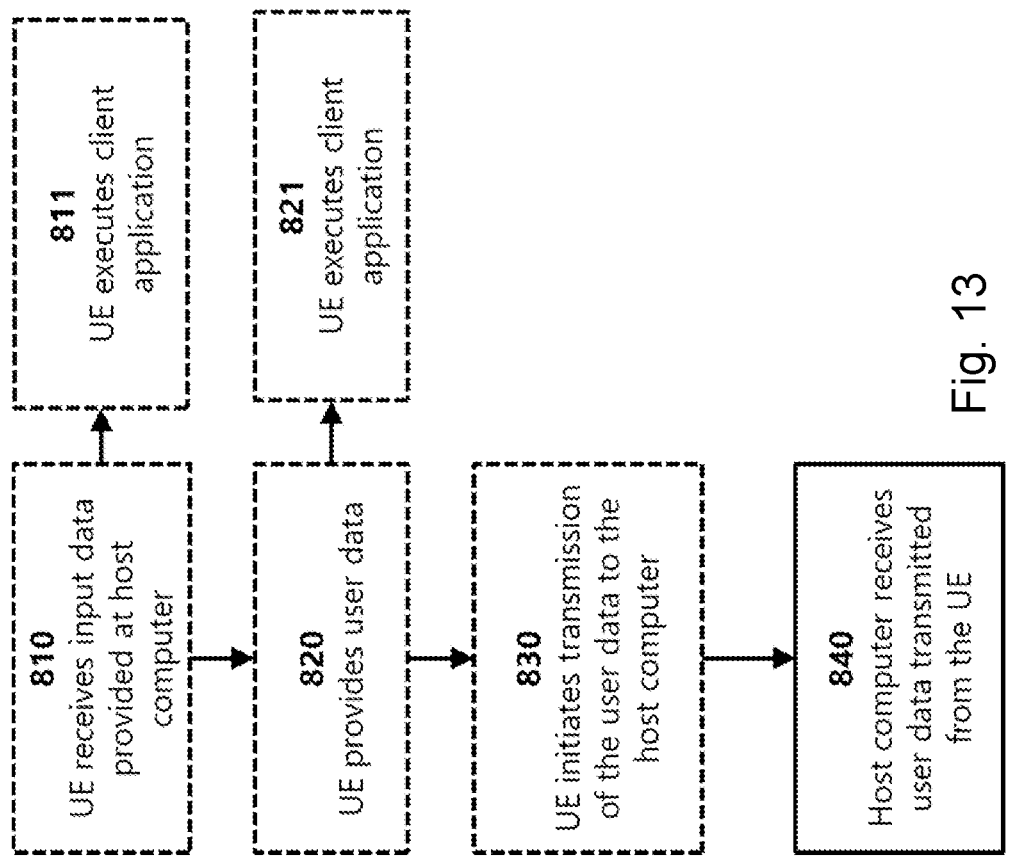
FIG. 13 is a flowchart illustrating a method implemented in a communication system, according to certain embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 14:
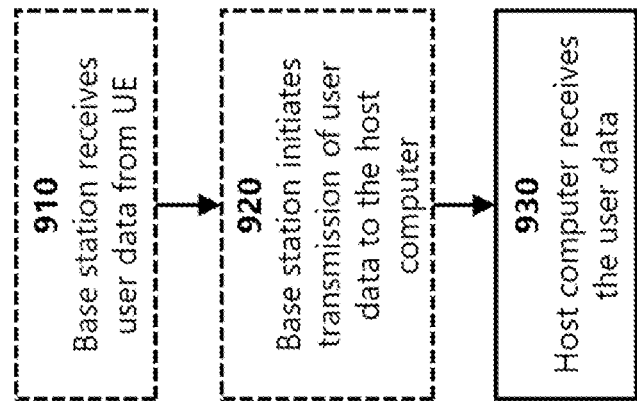
FIG. 14 is a flowchart illustrating a method implemented in a communication system, according to certain embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GEO Geostationary Orbit
GERAN GSM EDGE Radio Access Network
gNB Base station in NR
GNSS Global Navigation Satellite System
GPS Global Positioning System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MIMO Multiple-Input Multiple-Output
MME Mobility Management Entity
MSC Mobile Switching Center
NPDCCH Narrowband Physical Downlink Control Channel
NR New Radio
NTN Non-Terrestrial Networks
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PA Power Amplifier
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RA Random Access
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SRI SRS resource indicator
SRS Sounding Reference Signal
SS Synchronization Signal
SSS Secondary Synchronization Signal
TDD Time Division Duplex
TDOA Time Difference of Arrival
TFRE Time Frequency Resource Element
TOA Time of Arrival
TPC Transmit Power Control
TPMI Transmit Precoder Matrix Indicator
TRI Transmission Rank Indicator
TRP Transmit Reception Point
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for measurement reporting, the method comprising:
   receiving a conditional handover (CHO) configuration comprising one or more CHO candidate cells and associated triggering conditions;
   receiving an indication that the wireless device is allowed to include measurement information for CHO candidate cells not comprised in the CHO configuration;
   generating a measurement report comprising measurement information for the one or more CHO candidate cells and at least one new CHO candidate cell not comprised in the CHO configuration; and
   transmitting the measurement report to a network node;
   wherein the measurement information for the one or more CHO candidate cells includes measurement information for CHO candidate cells that do not meet their associated triggering conditions.

2. The method of claim 1, wherein the wireless device always includes measurement information for the one or more CHO candidate cells in the measurement report when CHO is configured for the wireless device.

3. The method of claim 1, wherein the wireless device includes measurement information for one or more CHO candidate cells in the measurement report when a measurement for the CHO candidate cell is above or below a preconfigured threshold.

4. The method of claim 1, wherein the wireless device includes measurement information for the one or more CHO candidate cells in the measurement report when a sorting quality has changed.

5. The method of claim 1, wherein the measurement report comprises one or more of:
   an event triggered measurement report;
   a periodical measurement report;
   a cell global identity (CGI) report;
   a cross-link interference (CLI) report;
   a system frame number frame timing difference (SFTD) report;
   a measurement report configured in a measId that is also used for a CHO configuration trigger condition; and
   a measurement report configured in a measId for event triggered measurement reporting that is associated to the same measObject as another measId for CHO.

6. The method of claim 1, wherein the measurement information comprises one or more of:
   CHO target cell candidate measurements per cell;
   CHO target cell candidate list that are fulfilling a condition; and
   beam measurement information for CHO target cell candidates.

7. The method of claim 1, further comprising receiving a CHO configuration update from the network node based on the transmitted measurement report.

8. A wireless device capable of performing measurement reporting, the wireless device comprising processing circuitry operable to:
   receive a conditional handover (CHO) configuration comprising one or more CHO candidate cells and associated triggering conditions;
   receive an indication that the wireless device is allowed to include measurement information for CHO candidate cells not comprised in the CHO configuration;
   generate a measurement report comprising measurement information for the one or more CHO candidate cells and at least one new CHO candidate cell not comprised in the CHO configuration; and
   transmit the measurement report to a network node;
   wherein the measurement information for the one or more CHO candidate cells includes measurement information for CHO candidate cells that do not meet their associated triggering conditions.

9. The wireless device of claim 8, wherein the wireless device always includes measurement information for the one or more CHO candidate cells in the measurement report when CHO is configured for the wireless device.

10. The wireless device of claim 8, wherein the wireless device includes measurement information for one or more CHO candidate cells in the measurement report when a measurement for the CHO candidate cell is above or below a preconfigured threshold.

11. The wireless device of claim 8, wherein the wireless device includes measurement information for the one or more CHO candidate cells in the measurement report when a sorting quality has changed.

12. The wireless device of claim 8, wherein the measurement report comprises one or more of:
   an event triggered measurement report;
   a periodical measurement report;
   a cell global identity (CGI) report;
   a cross-link interference (CLI) report;
   a system frame number frame timing difference (SFTD) report;
   a measurement report configured in a measId that is also used for a CHO configuration trigger condition; and
   a measurement report configured in a measId for event triggered measurement reporting that is associated to the same measObject as another measId for CHO.

13. The wireless device of claim 8, wherein the measurement information comprises one or more of:
  CHO target cell candidate measurements per cell;
  CHO target cell candidate list that are fulfilling a condition; and
  beam measurement information for CHO target cell candidates.

14. The wireless device of claim 8, the processing circuitry further operable to receive a CHO configuration update from the network node based on the transmitted measurement report.

15. A network node comprising processing circuitry operable to:
  provide a wireless device with a conditional handover (CHO) configuration comprising one or more CHO candidate cells and associated triggering conditions;
  provide the wireless device with an indication that the wireless device is allowed to include measurement information for CHO candidate cells not comprised in the CHO configuration;
  receive a measurement report from the wireless device, the measurement report comprising measurement information for one or more conditional handover (CHO) candidate cells and at least one new CHO candidate cell not comprised in the CHO configuration;
  wherein the measurement information for the one or more CHO candidate cells includes measurement information for CHO candidate cells that do not meet their associated triggering conditions; and
  determine one or more CHO configuration updates for the wireless device based at least in part on the received measurement information for the one or more conditional handover CHO candidate cells.

16. The network node of claim 15, wherein the CHO configuration update includes one or more of:
  removing a CHO candidate cell from the CHO configuration;
  adding a CHO candidate cell to the CHO configuration; and
  modifying an existing CHO candidate cell in the CHO configuration.

17. The network node of claim 16, wherein the wireless device always includes measurement information for the one or more CHO candidate cells in the measurement report when CHO is configured for the wireless device.

18. The network node of claim 16, wherein the wireless device includes measurement information for one or more CHO candidate cells in the measurement report when a measurement for the CHO candidate cell is above or below a preconfigured threshold.

19. The network node of claim 16, wherein the wireless device includes measurement information for the one or more CHO candidate cells in the measurement report when a sorting quality has changed.

20. The network node of claim 15, the processing circuitry further operable to configure the wireless device with two measurement identifiers for a same measurement object and with two report configurations, wherein one of the report configurations is for CHO and the other report configuration is for a measurement report.

\* \* \* \* \*